United States Patent [19]
Hayakawa et al.

[11] Patent Number: 6,144,502
[45] Date of Patent: Nov. 7, 2000

[54] VIEWFINDER OPTICAL SYSTEM AND OPTICAL APPARATUS HAVING THE SAME

[75] Inventors: Shingo Hayakawa, Yokohama; Hiroshi Saito, Kawasaki, both of Japan

[73] Assignee: Canon Kabushiki Kaisha, Tokyo, Japan

[21] Appl. No.: 09/217,987

[22] Filed: Dec. 22, 1998

[30] Foreign Application Priority Data

Dec. 24, 1997 [JP] Japan .................................. 9-366424
Dec. 17, 1998 [JP] Japan ................................ 10-375742

[51] Int. Cl.⁷ .......................... G02B 17/00; G02B 5/18; G03B 13/08
[52] U.S. Cl. ...................... 359/726; 359/569; 359/570; 396/385
[58] Field of Search ................... 359/558, 569, 359/570, 643–647, 729; 396/373, 382, 384–385

[56] References Cited

U.S. PATENT DOCUMENTS

| | | | |
|---|---|---|---|
| 4,027,327 | 5/1977 | Harada | 354/201 |
| 4,774,401 | 9/1988 | Yamada et al. | 250/201 |
| 4,855,780 | 8/1989 | Hayakawa | 354/432 |
| 4,870,443 | 9/1989 | Hayakawa | 354/432 |
| 5,119,124 | 6/1992 | Ito et al. | 354/409 |
| 5,446,588 | 8/1995 | Missig et al. | 359/565 |
| 5,742,262 | 4/1998 | Tabata et al. | 345/8 |
| 5,898,525 | 4/1999 | Suzuki | 359/684 |

FOREIGN PATENT DOCUMENTS

| | | |
|---|---|---|
| 2-181713 | 7/1990 | Japan . |
| 6-235870 | 8/1994 | Japan . |
| 6-324262 | 11/1994 | Japan . |
| 7-77422 | 4/1997 | Japan . |
| 9-105863 | 4/1997 | Japan . |
| 9-281414 | 10/1997 | Japan . |
| 9-281416 | 10/1997 | Japan . |

Primary Examiner—Scott J. Sugarman
Assistant Examiner—David N. Spector
Attorney, Agent, or Firm—Fitzpatrick, Cella, Harper & Scinto

[57] ABSTRACT

A viewfinder optical system includes an image inverting optical unit for inverting an image formed by an objective optical unit, the image inverting optical unit inverting the image by using a reflecting action of light, and an eyepiece optical unit on which light from the image inverting optical unit is made incident, wherein the viewfinder optical system has a diffractive optical surface.

10 Claims, 19 Drawing Sheets

SPHERICAL ABERRATION | FIELD CURVATURE ASTIGMATISM | DISTORTION (%) | LATERAL CHROMATIC ABERRATION (F-LINE)

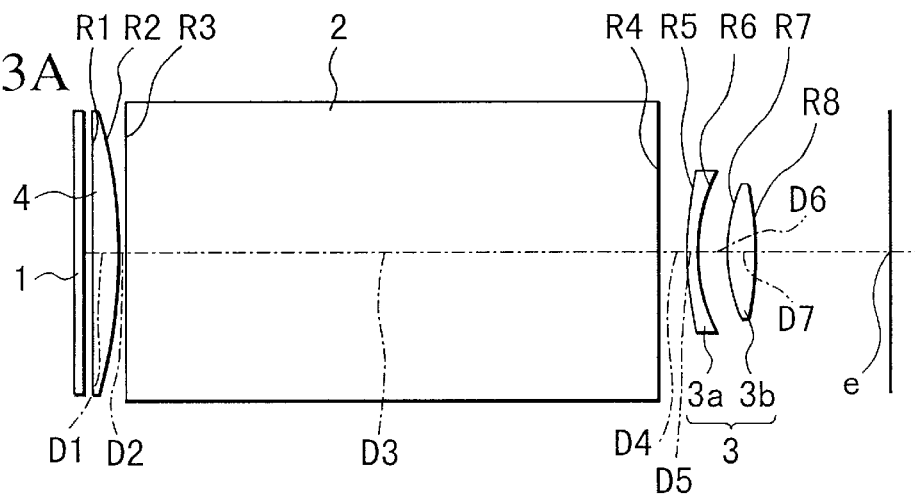
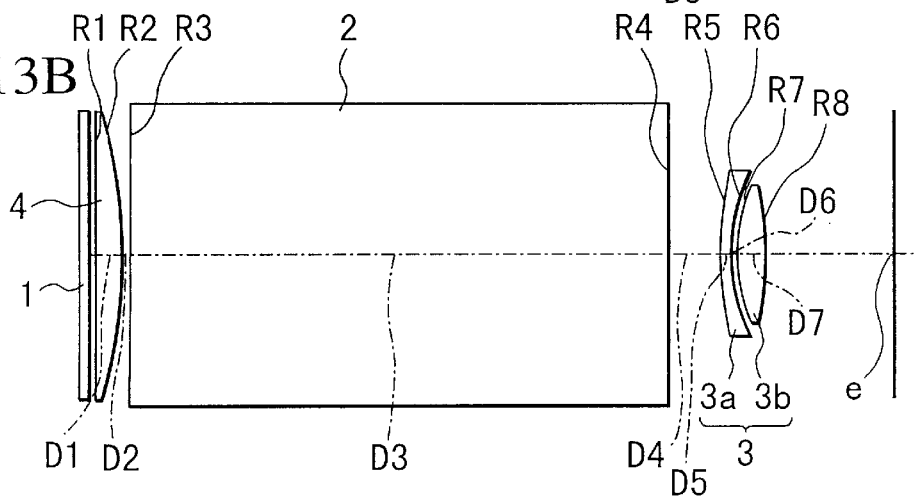
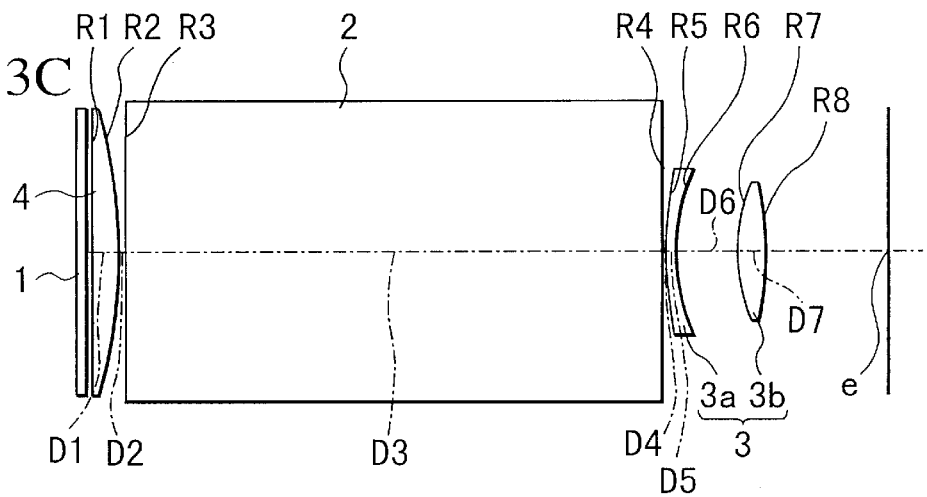

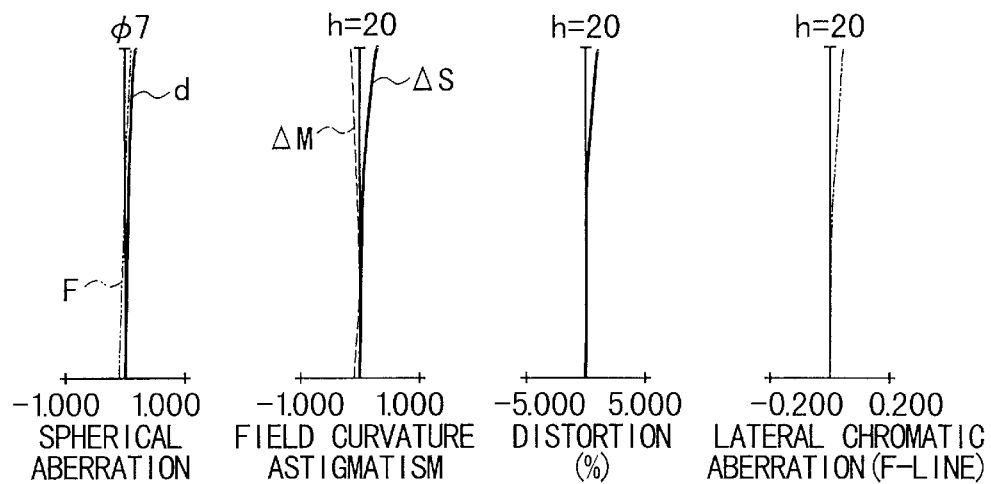
FIG. 14A1  FIG. 14A2  FIG. 14A3  FIG. 14A4
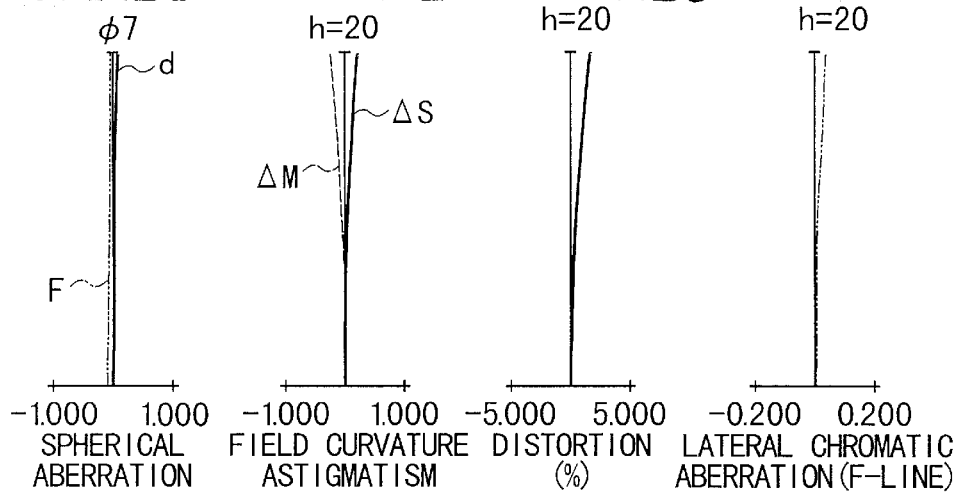
FIG. 14B1  FIG. 14B2  FIG. 14B3  FIG. 14B4
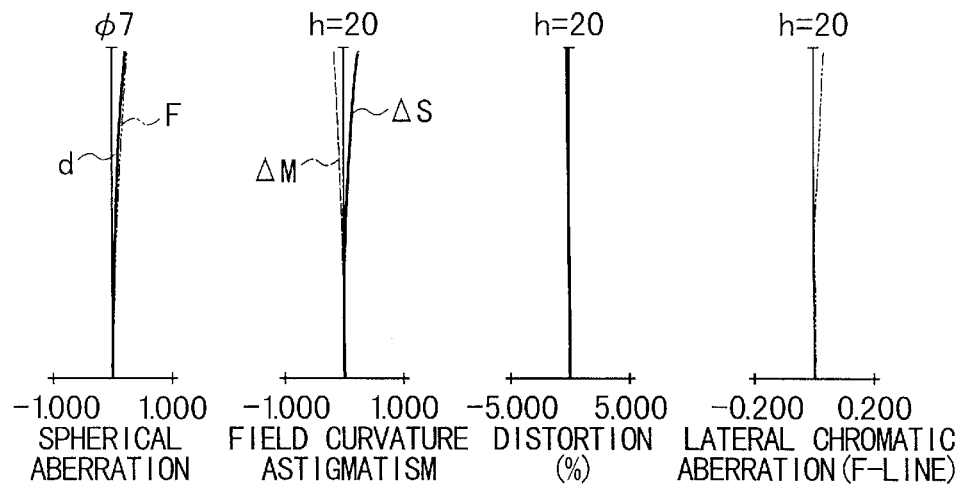
FIG. 14C1  FIG. 14C2  FIG. 14C3  FIG. 14C4

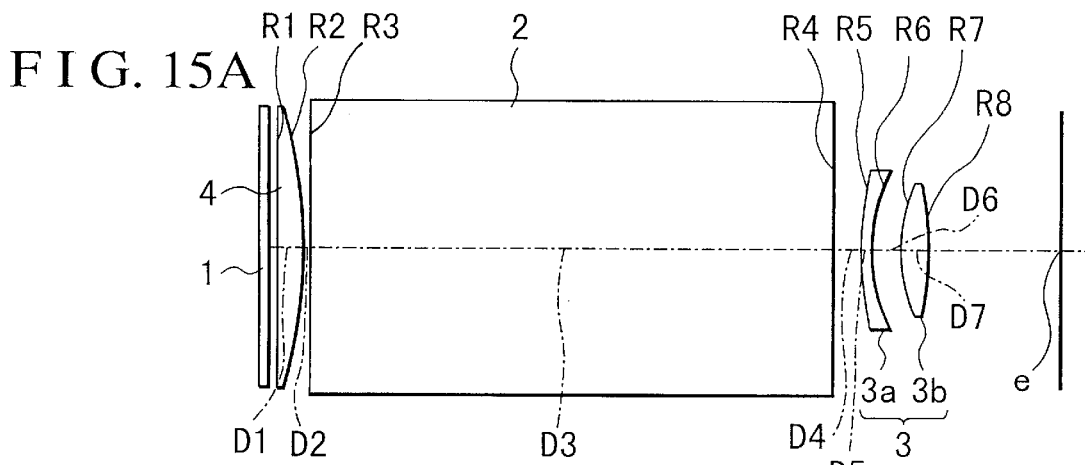
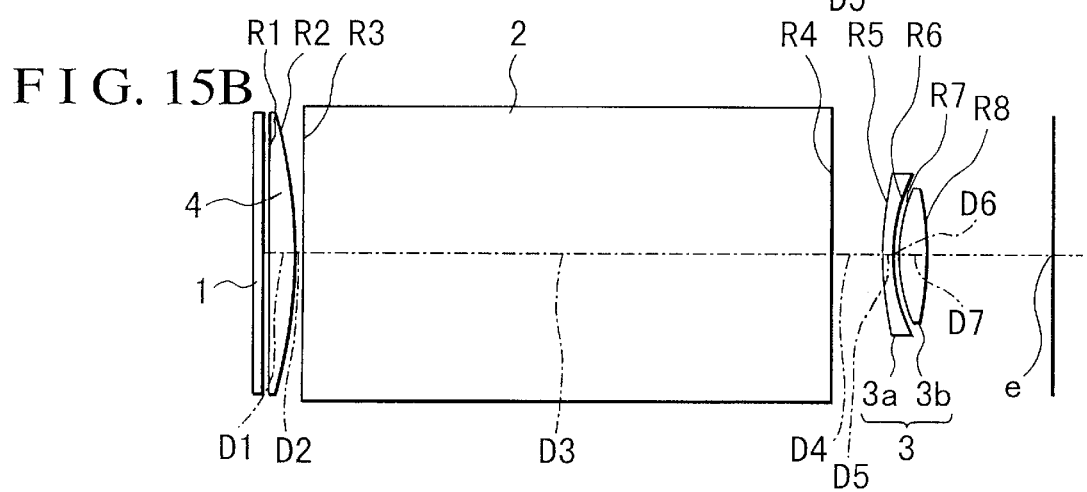
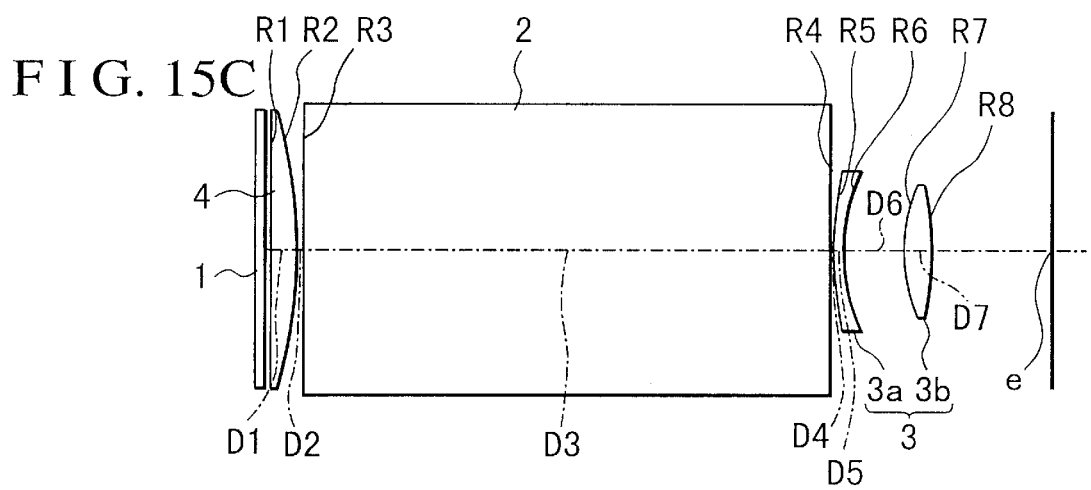

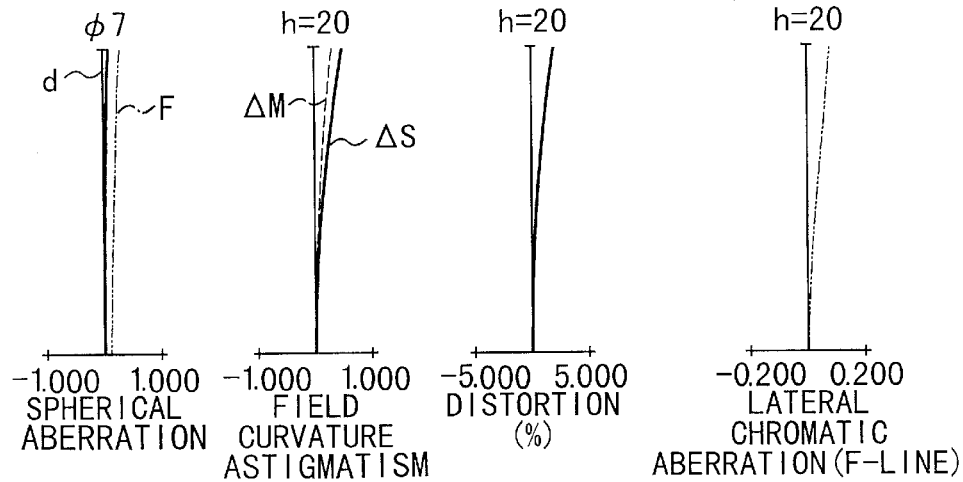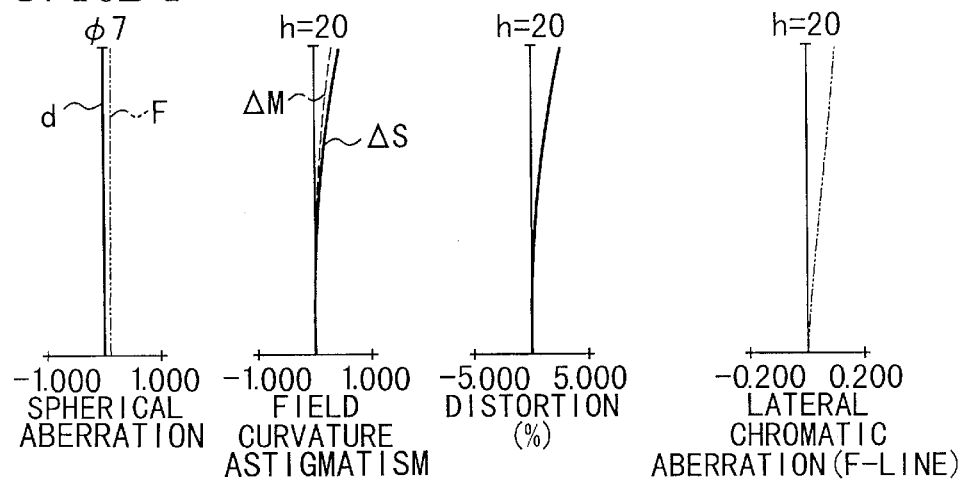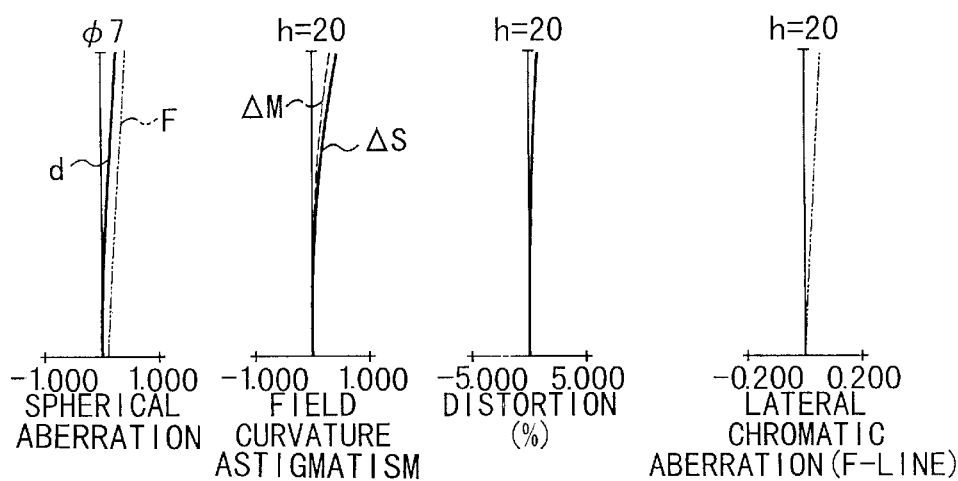

FIG. 22
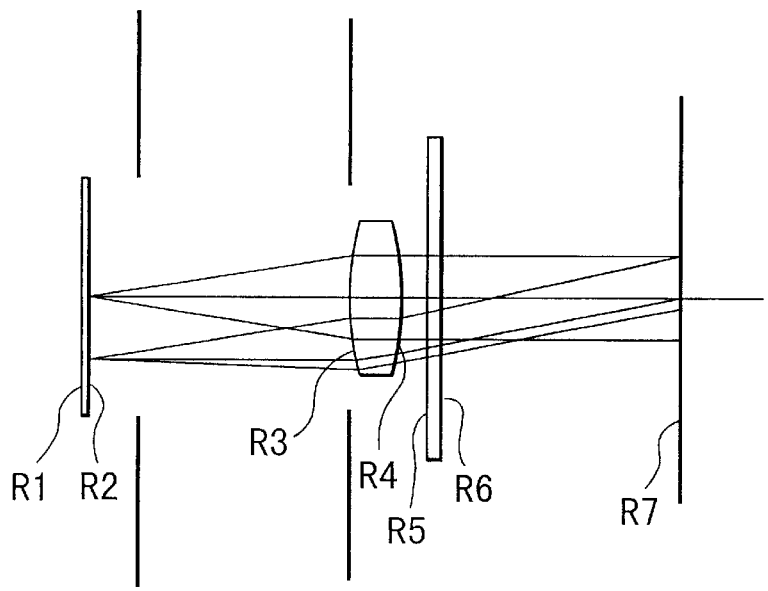
FIG. 23A  FIG. 23B  FIG. 23C  FIG. 23D
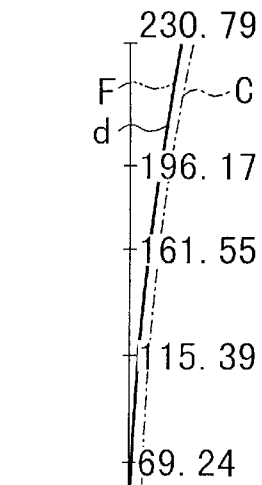
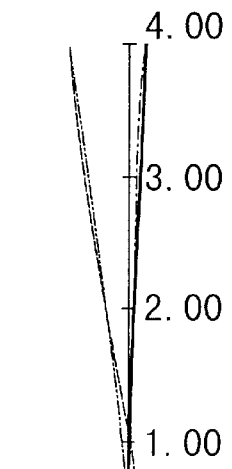
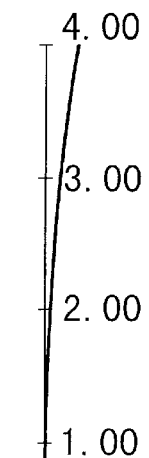
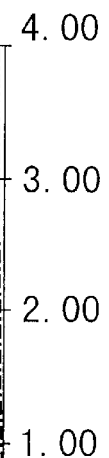

SPHERICAL      ASTIGMATISM    DISTORTION      LATERAL
ABERRATION                        (%)         CHROMATIC
                                              ABERRATION

VIEWFINDER OPTICAL SYSTEM AND OPTICAL APPARATUS HAVING THE SAME

BACKGROUND OF THE INVENTION

1. Field of the Invention

The present invention relates to a viewfinder optical system of simple form suited to be used in cameras or the like.

2. Description of Related Art

In the viewfinder optical system, an image of an object to be photographed is formed on the focusing screen, which is observed by looking through the eyepiece lens. For the eyepiece lens, until now, many simple configurations have been proposed.

(i) What has been known as the most common configuration ever is the combination of a positive lens of relatively low dispersion and a negative lens of relatively high dispersion cemented together to form a cemented lens of positive refractive power.

(ii) Recently, to reduce the production cost, the eyepiece lens simplified to only one plastic lens has come to find its use in many viewfinders.

(iii) Further, to reduce the weight of the camera and achieve a much more desired reduction of the production cost, the optical system for forming an erecting image is taken into consideration, and an assembly of reflecting mirrors is employed instead of the heavy prism of glass material.

Such a mirror type optical system for forming an erecting image takes a longer optical path with a decrease of the finder magnification. To compensate for this, the eyepiece lens has to be constructed with two lenses of positive and negative refractive powers. This type of viewfinder has been proposed in, for example, Japanese Laid-Open Patent Applications No. Hei 2-181713 and No. Hei 6-235870.

(iv) Meanwhile, as the optical system using a diffractive optical surface, mention may be made of, for example, Japanese Laid-Open Patent Application No. Hei 6-324262, in which the diffractive optical surface is used in a part of a photographic optical system for the purpose of further improving the correction of aberrations.

As another example of application of the diffractive optical surface to an observation optical apparatus, mention may be made of, for example, U.S. Pat. No. 5,446,588, in which the eyepiece comprises three lenses. At least one of their lens surfaces is made to be a diffractive optical surface. With this diffractive optical surface, various aberrations including spherical aberration are further improved to insure that the eye relief becomes longer and, at the same time, the apparent field of view becomes wider. The eyepiece lens disclosed here is of high performance.

(v) Yet another recent trend in the field of art of lens shutter cameras is to improve the compact form of the objective lens system. To cope with this trend, there is a growing demand that the external viewfinder to be incorporated in the camera, too, be of compact size. To achieve realization of a compact viewfinder, not only the total number of constituent lenses must be reduced, but also the refractive power of each of these lenses must be increased. As a result, it becomes difficult to obtain a high optical performance. To remedy this, the choice of glass materials in making up the lens elements may be considered, so that the ranges of refractive indices and dispersions are widened.

However, as disclosed in Japanese Laid-Open Patent Application No. Hei 9-105863, for the optical parts of the external viewfinder such as that in the lens shutter camera, on consideration of the reduction of the cost and the productivity, plastic materials are often used. Hence, it becomes of great importance to achieve improvements of the performance and compact form of the optical system without sacrificing the cost and productivity.

The various conventional examples (i) to (v) described above have their respective individual problems as follows.

(a) As, in the prior known technique (i), the eyepiece lens is constructed with the positive lens of relatively low dispersion and the negative lens of relatively high dispersion which are cemented together to form a cemented lens of positive refractive power, the difference in dispersion between these lenses is utilized to correct mainly lateral chromatic aberration. With this, diffusion of colors at points of high contrast in the image of the object to be photographed, or at the field-of-view frame, is reduced, thus realizing a viewfinder which is comfortable to view. However, for such a construction, it is substantially impossible to largely reduce the cost in producing the eyepiece lens.

(b) Then, as in the prior known technique (ii), the viewfinder is recently constructed with one plastic lens. Since this is amenable with the injection molding manufacture technique, the production cost is remarkably reduced. From the demand for reduction of the production cost, the opportunity of using this technique is increasing. However, as a matter of course, with such a construction, as far as the ordinary or refractive optical system is concerned, chromatic aberrations become substantially impossible to correct, thus lowering the comfortability of looking through the viewfinder.

(c) The prior known technique (iii) is to construct the optical members for forming an erecting image with reflecting mirrors and to construct the eyepiece lens with two lenses. In such a type of viewfinder optical system, if the 2-component eyepiece is constructed in the combination of a positive lens of relatively low dispersion and a negative lens of relatively high dispersion, correction of chromatic aberrations becomes possible. However, if the two constituent lenses of the eyepiece are made up from equivalent plastic materials in order to reduce the production cost of the camera, correction of chromatic aberrations becomes difficult.

For example, acrylic resin is available as the plastic material of relatively low dispersion and polycarbonate resin as the plastic material of relatively high dispersion. So, if these materials are used in the positive and negative lenses, respectively, it becomes possible to correct the chromatic aberrations of the viewfinder optical system. However, polycarbonate resin is slightly weak in mechanical strength. If a counter-measure to such a problem, the advantage in cost is diminished. So, it is not suited to be used.

(d) The prior known technique (iv) using the diffractive optical surface is adapted to the optical system having a large number of lens members and has an aim to further improve the correction of all aberrations. That is, when correcting the aberrations of the light rays, it has been the common practice to use the diffractive optical surface as one degree of freedom. Although the diffractive optical surface can be used for a similar purpose of reducing the number of lens members to that in using the aspheric surface which is well known in the art, it may otherwise be considered, as a method of more effectively adapting the application of the characteristics of the diffractive optical surface, that the use of the diffractive optical surface is limited to the correction of chromatic aberrations alone.

(e) In the prior known technique (v), the eyepiece lens of the viewfinder optical system is not required in general to have a particularly large apparent field of view and a particularly long eye relief. Even with the eyepiece lens in the form of a single lens, all aberrations except chromatic aberrations leave little residual, being corrected so much as to be negligible in many cases.

As the criterion for determining whether or not the viewfinder is comfortable to look through, the magnitude of the residual chromatic aberrations is adopted. If this quantity is large, color diffusion appears at the contour of an object to be observed, or flare components are produced, lowering the quality of the viewfinder image.

In general, the ordinary or spherical lenses or like refractive optical elements constitute a real image viewfinder and its optical performance is improved by arranging a pair or pairs of lens units of positive and negative refractive powers. To correct the various aberrations to a minimum and in good balance, the number of lens members is caused to increase. Introduction of an aspheric surface is advantageous at reducing the number of lens members in such a manner as to keep the optical performance. As far as the chromatic aberrations are concerned, however, for the correcting purposes, determination must be made of which two of the lens members of positive and negative refractive powers are selected to be paired with their materials in desired dispersion difference. Even by introducing an aspheric surface, no effect of correcting the chromatic aberrations can be expected.

BRIEF SUMMARY OF THE INVENTION

An object of the present invention is to eliminate the problems (a) to (d) of the prior art and to provide a viewfinder optical system which has a simple form and can be realized in low cost, while still permitting the chromatic aberrations the eyepiece lens produces to be particularly corrected well, thus realizing formation of the finder image comfortable to view.

Another object of the present invention is to eliminate the problem (e) of the prior art and to improve the performance of the real image viewfinder. In particular, it is directed to provide a viewfinder optical system whose number of constituent lenses is reduced to a compact form and which is corrected well for chromatic aberrations.

To attain the above objects, in accordance with an aspect of the invention, there is provided a viewfinder optical system, which comprises an image inverting optical unit for inverting an image formed by an objective optical unit, the image inverting optical unit inverting the image by using a reflecting function, and an eyepiece optical unit on which light from the image inverting optical unit is made incident, wherein the viewfinder optical system has a diffractive optical surface.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 13A to 13C are block diagrams of a viewfinder optical system according to a fourth embodiment of the invention in different operative positions.

FIGS. 14A1 to 14A4, 14B1 to 14B4, and 14C1 to 14C4 are graphic representations of the aberrations of the viewfinder optical system of the fourth embodiment.

FIGS. 15A to 15C are block diagrams of an analogous example 4 of an optical system analogous to the viewfinder optical system of the fourth embodiment except for no use of the diffractive optical surface.

FIGS. 16A1 to 16A4, 16B1 to 16B4, and 16C1 to 16C4 are graphic representations of the aberrations of the analogous example 4 of the optical system shown in FIGS. 15A to 15C.

FIG. 22 is a block diagram, in developed form, of a viewfinder optical system according to a seventh embodiment of the invention.

FIGS. 23A to 23D are graphic representations of the aberrations of the viewfinder optical system of the seventh embodiment.

DETAILED DESCRIPTION OF THE INVENTION

Hereinafter, preferred embodiments of the invention will be described in detail with reference to the drawings.

Figure 1:
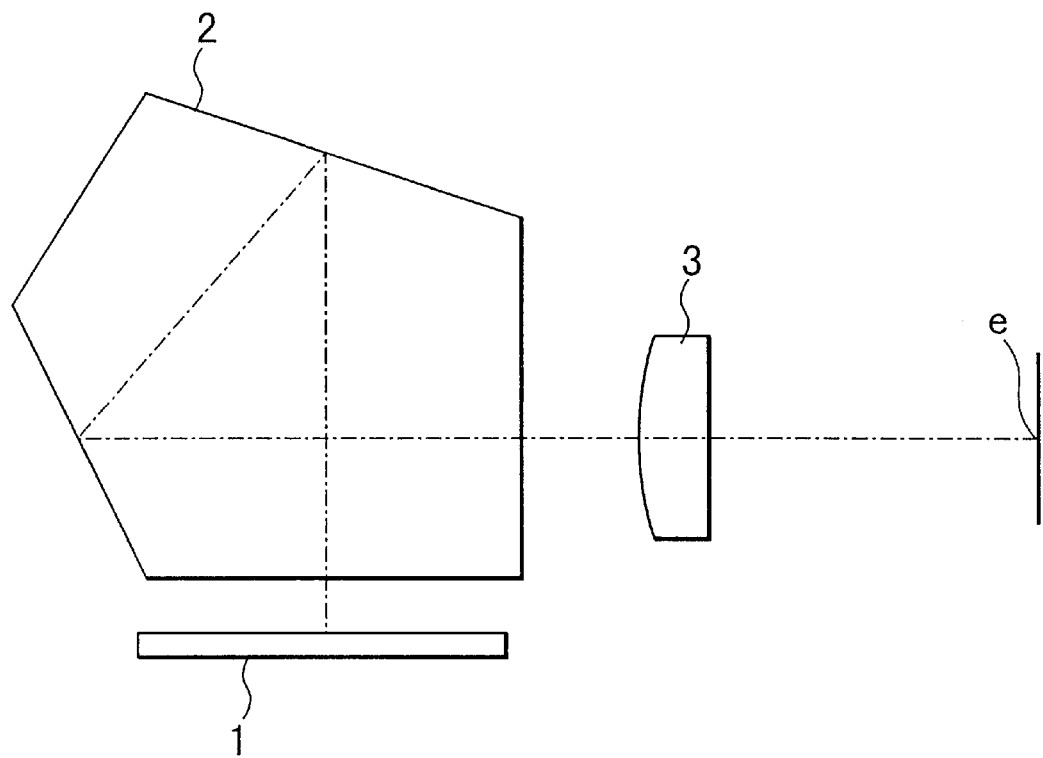
FIG. 1 is a longitudinal section view of a viewfinder optical system according to a first embodiment of the invention.

In FIG. 1, according to the first embodiment, a viewfinder optical system has an optical path from a focusing screen 1 to the pupil of an observer's eye "e" and is provided therein with an image inverting member 2, such as a pentagonal prism, whose reflections are utilized to invert an object image formed on the focusing screen 1 by an objective (not shown), and an eyepiece lens 3 which is composed of one or two lens elements made from plastic material or the like. Of the lens surfaces in the eyepiece lens 3, at least one lens surface is made to be a diffractive optical surface.

The use of such a configuration provides a possibility of correcting well mainly the lateral chromatic aberration the eyepiece lens 3 produces without having to increase the number of parts of the eyepiece lens 3 constituting the viewfinder optical system. Thus, the viewfinder optical system that is comfortable to look at the image can be realized. Also, even with such a construction, the eyepiece lens 3, because of being amenable to the injection molding manufacture techniques, does not contribute to a large increase of cost.

It should be noted that, as the eyepiece lens 3 is constructed with two lens elements, the ratio of Abbe numbers $v_1$ and $v_2$ of the two lens elements lies in the following range:

$$0.8 < v_1/v_2 < 1.25 \tag{1}$$

If this condition is satisfied, its result becomes prominent.

The inequalities of condition (1) are set forth on the assumption that the two lens elements of the eyepiece lens 3 are made from the same or like optical material or materials. In a case where the selection of plastic optical materials is made only with more emphasis on the mechanical strength, if all the lens elements to be used are only of the refractive form, the chromatic aberrations are hardly corrected. In this case, therefore, it becomes particularly advantageous to employ a diffractive optical surface.

It should be also noted that the diffractive optical surface is desired to have such a form as to correct the lateral chromatic aberration produced by the refracting action of the positive lens. In the general case, the eyepiece lens 3 is constructed with one positive lens. Particularly in such a case, because the number of lens elements is so small, the refracting action of this lens element results in undercorrection of lateral chromatic aberration of the viewfinder optical system.

The diffractive optical surface can be expressed by using the phase $\phi(H)$ at a distance H from the optical axis with the phase coefficient $C_i$ for the term in the i-th degree as follows:

$$\phi(H)=(2\pi/\lambda)/(C_2 \cdot H^2 + C_4 \cdot H^4 + C_6 \cdot H^6 + C_8 \cdot H^8) \tag{2}$$

where $\lambda$ is the reference wavelength (spectral d-line).

Then, it is found that the paraxial optical power of the diffractive optical surface and the chromatic aberrations for the reference wavelength can be controlled in accordance with variation of the phase coefficient C2 of the equation (2). It is also found that the phase coefficient $C_4$ and those for the terms in higher degrees can be used in order to produce a similar effect to that of the aspheric surface in varying the optical power against the height of incidence of light on the diffractive optical surface and, at the same time, the chromatic aberrations for the reference wavelength can be controlled in accordance with variation of the height of incidence of light. In either case, for a small change of the optical power, a large change of the chromatic aberrations can be obtained.

The use of the diffractive optical surface in the optical system leads to the possibility of simultaneously realizing the correction of aberrations, as done when the aspheric surface is used, and the control of the chromatic aberrations which could not be realized in the common practice by any aspheric surface. By using such features of the diffractive optical surface, it becomes possible that, even when the optical system is constructed with lenses only in a smaller number, particularly the lateral chromatic aberration is corrected well.

In general, the Abbe number (reciprocal dispersive power) vd of the refractive optical system is expressed by the following formula:

$$vd=(Nd-1)/(NF-NC)$$

where Nd, NC and NF are the refractive indices for the spectral d-line, C-line and F-line.

The condition for correcting the chromatic aberrations of the optical system is to make the refractive powers $\psi_i$ and Abbe numbers $v_i$ of all the lenses constituting the optical system nearly correlated by the following expression:

$$\Sigma(\psi_i/v_i)=0 \tag{3}$$

However, any of the usual optical materials has a positive value in Abbe number. Therefore, if, as a refractive optical system is formed to a positive refractive power at a certain value as a whole, it is constructed with either a single lens, or lenses whose refractive powers are of the same sign only, or lenses made from optical materials whose dispersions are almost equal to one another, the above equation (3) cannot be satisfied.

Meanwhile, if the diffractive optical surface has its diffracting action expressed by a corresponding value vd to the value of the reciprocal dispersive power of the refractive optical system, the following relation is obtained:

$$vd=\lambda d/(\lambda F-\lambda C)$$

where $\lambda d$, $\lambda C$ and $\lambda F$ are the wavelengths of the spectral d-line, C-line and F-line.

From the values of these wavelengths, vd=−3.45 is found.

Also, the paraxial optical power $\psi$ for the main wavelength (d-line) of the diffractive optical element with the diffracted light in the first order is expressed from the equation (2) for the phase of the diffractive optical surface by using the coefficient $C_2$ for the term in the second degree, as follows:

$$\psi=-2 \cdot C_2$$

In the optical system having the diffractive optical surface, therefore, the following condition:

$$\Sigma(\psi_i/\nu_i)+\Sigma(2\cdot C_{2i}/3.45)=0 \quad (4)$$

can be regarded as an approximate condition for correcting chromatic aberrations. So, it becomes possible that, even when the refractive optical system is made up in a simple form, good correction of chromatic aberrations is assured.

From the equation (4), and further using the optical power $\psi_E$ of the eyepiece lens at the standard diopter and the paraxial optical power $\psi_{Bi}$ of the i-th diffractive optical surface, it is desired to form the diffractive optical surfaces to such shapes as to satisfy the following condition:

$$0.005<\Sigma\psi_{Bi}/\psi_E<0.040 \quad (5)$$

The inequalities of condition (5) give a range for the ratio of the sum of the optical powers of the diffractive optical surfaces to the optical power for the standard diopter of the eyepiece lens 3 and have an aim chiefly to correct chromatic aberrations well when the optical system is made up by using plastic optical materials. When this condition is satisfied, the term in the second degree of the diffractive optical surface takes an appropriate value to determine a proper value of the optical power of the diffractive optical surface. Although the condition (5) is given by such an expression as to include even the case that a plurality of diffractive optical surfaces are in use, it is to be understood that, as will be disclosed in the embodiments presented later, even if only one surface is made to be the diffractive optical surface, the correction of chromatic aberrations sufficiently becomes possible.

Figure 2:
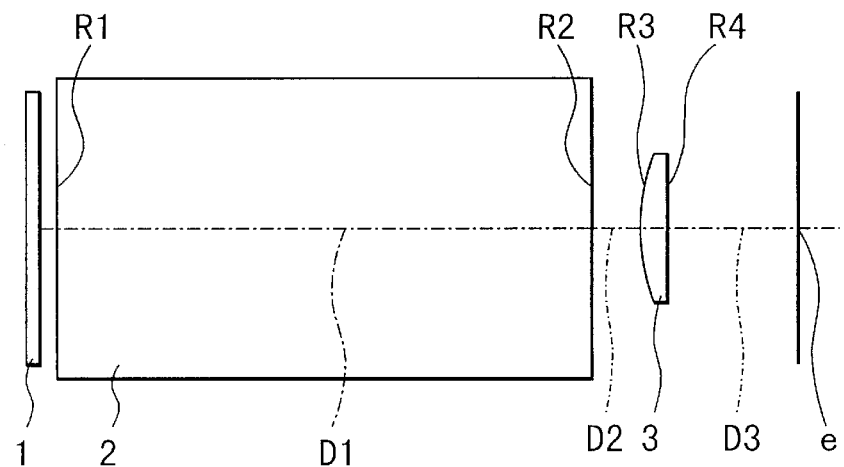
FIG. 2 is a block diagram, in developed form, of the viewfinder optical system of the first embodiment.
Figures 3A, 3B, 3C, 3D:
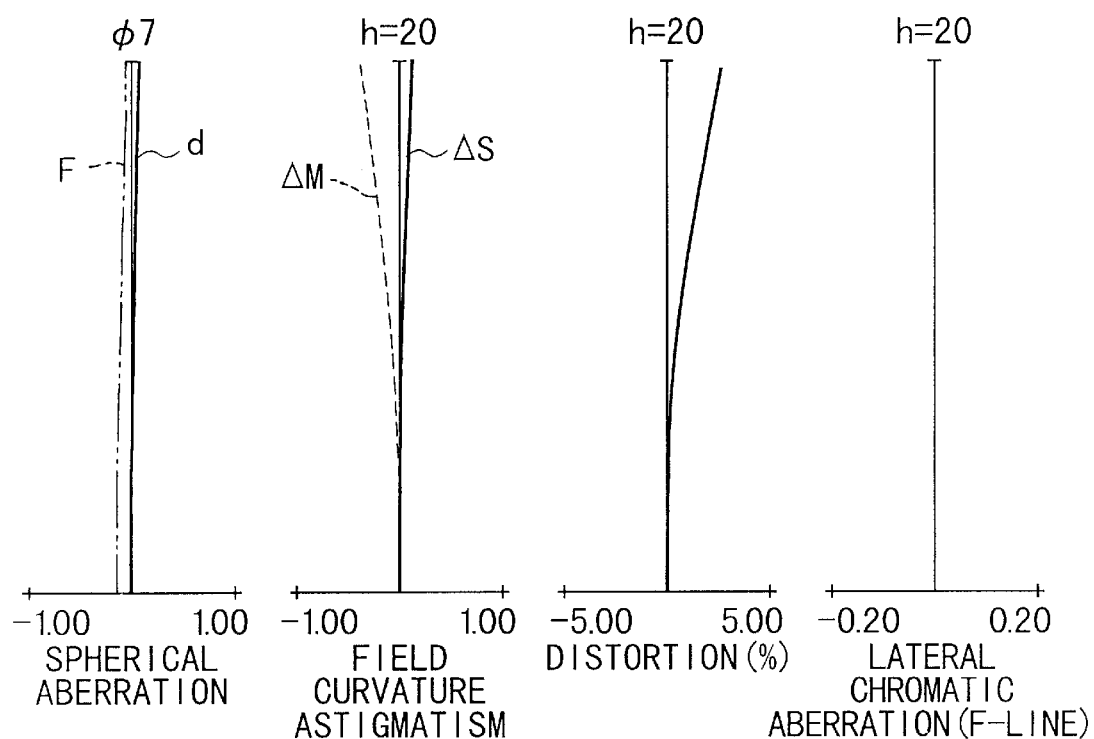
FIGS. 3A to 3D are graphic representations of the aberrations of the viewfinder optical system of the first embodiment.

FIG. 2 in longitudinal section view shows the developed form of the first embodiment of the viewfinder optical system shown in FIG. 1. Incidentally, in FIG. 2, R1, R2, R3, . . . represent the radii of curvature of the surfaces of all the optical members, and D1, D2, D3, . . . represent the separations between any successive two of the surfaces.

In the first embodiment, the eyepiece lens 3 is constructed with one plastic lens of positive optical power, and a lens surface on the observation side of the eyepiece lens 3 is made to be a diffractive optical surface, thus assuring reduction of the lateral chromatic aberration. FIGS. 3A to 3D graphically show the aberrations of the viewfinder optical system of the first embodiment as formed to a numerical example 1 to be described later.

Figure 4:
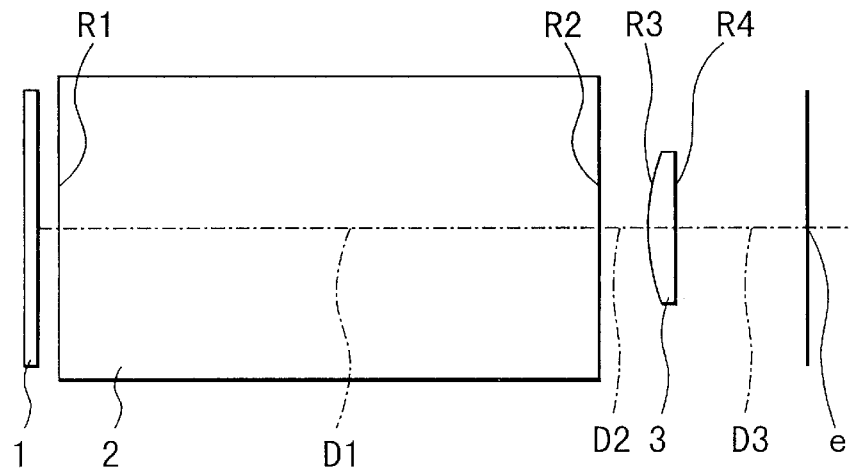
FIG. 4 is a block diagram of an analogous example 1 of an optical system analogous to the viewfinder optical system of the first embodiment except for no use of the diffractive optical surface.
Figures 5A, 5B, 5C, 5D:
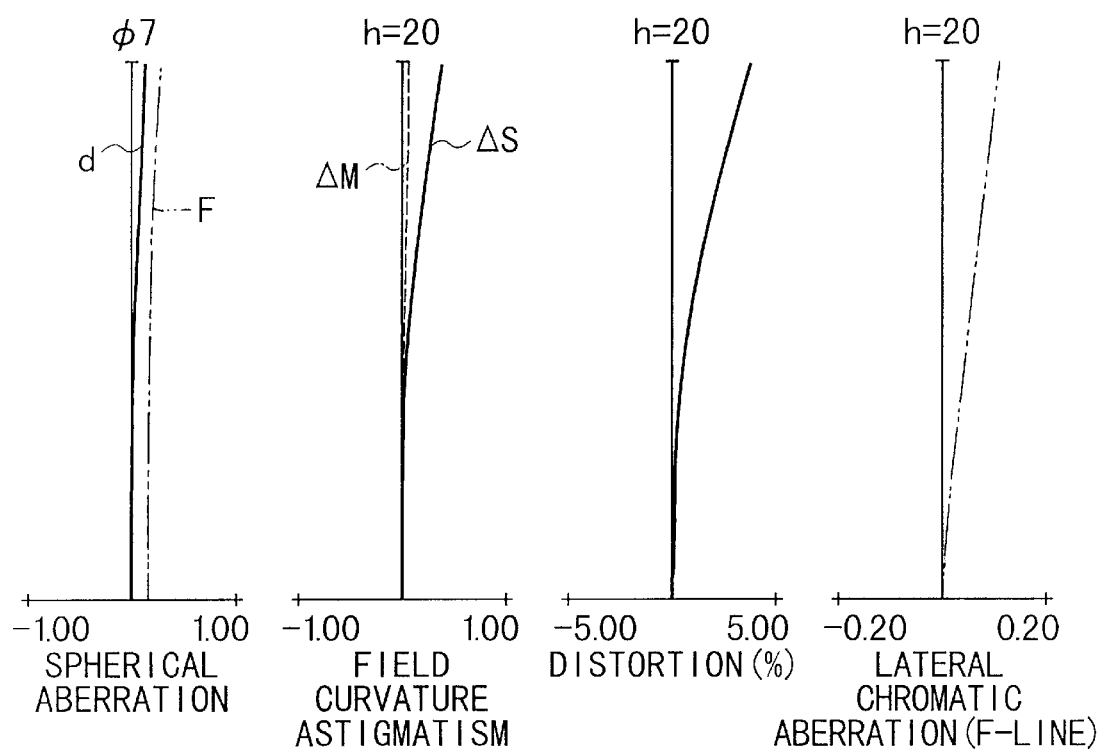
FIGS. 5A to 5D are graphic representations of the aberrations of the analogous example 1 shown in FIG. 4.

FIG. 4 in block diagram shows a viewfinder optical system which is analogous in prototype design to the first embodiment, but differs in not using the diffractive optical surface. FIGS. 5A to 5D graphically show the aberrations of this optical system as formed to an analogous example 1 to be described later.

Comparing FIG. 2 with FIG. 4, these eyepiece lenses 3 are formed to almost the same macroscopic outer shapes. Nonetheless, as is apparent from the aberration curves of FIGS. 3A to 3D and FIGS. 5A to 5D, the optical system of the first embodiment is far better corrected for the lateral chromatic aberration.

It will be appreciated that, in the first embodiment, the eyepiece lens 3 is constructed in the form of a single plastic lens with a diffractive optical surface in one of the surfaces thereof. With a very simple arrangement in use, there can be realized a viewfinder so much corrected well for the chromatic aberrations as to be comfortable to look through almost without causing any increase of cost.

It is to be noted that, in the first embodiment, the eyepiece lens 3 consists of a single lens of acrylic resin and the lens surface on the pupil "e" side is selected to be used as the diffractive optical surface. In the analogous example shown in FIG. 4, this diffractive optical surface is replaced by a refracting surface of almost the same paraxial optical power. The diffractive optical surface of the first embodiment functions in the paraxial zone as a lens surface of relatively weak positive power and, as shown in FIGS. 3A to 3D, serves as another lens surface, too, which is particularly adapted to correct well all aberrations of the viewfinder optical system. Incidentally, the diffractive optical surface may otherwise be taken at the lens surface on the screen 1 side of the eyepiece lens 3.

Figure 6:
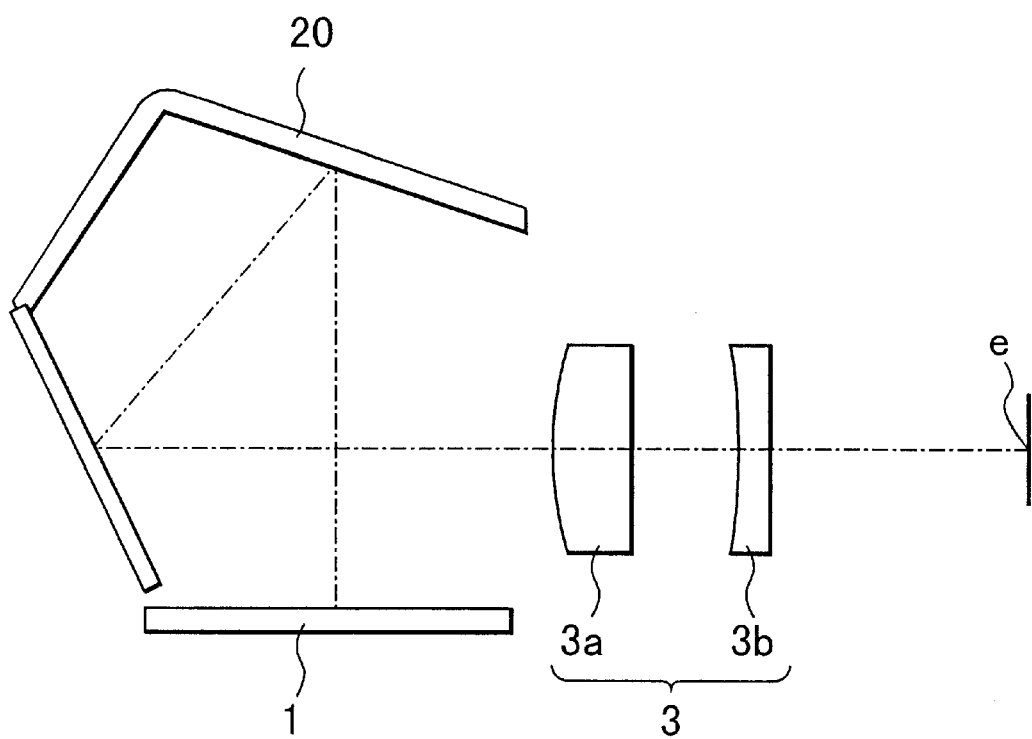
FIG. 6 is a longitudinal section view of a viewfinder optical system according to a second embodiment of the invention.
Figure 7:
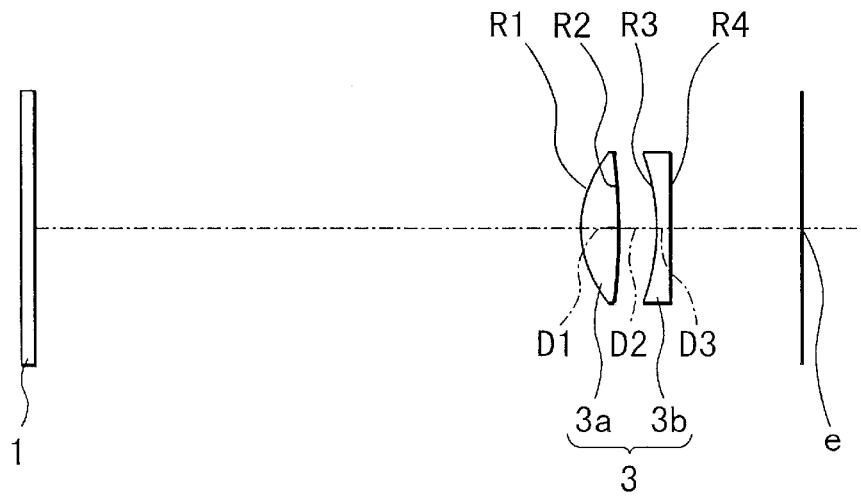
FIG. 7 is a block diagram, in developed form, of the viewfinder optical system of the second embodiment.
Figures 8A, 8B, 8C, 8D:
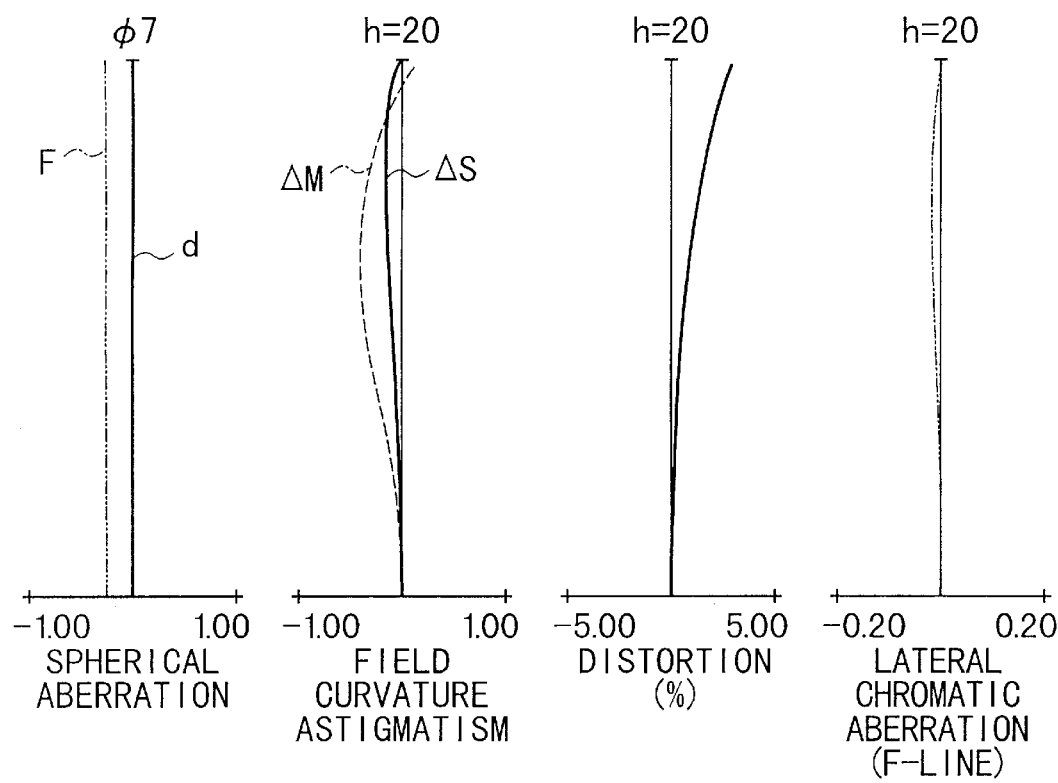
FIGS. 8A to 8D are graphic representations of the aberrations of the viewfinder optical system of the second embodiment.

FIG. 6 is a longitudinal section view of a viewfinder optical system according to a second embodiment of the invention. FIG. 7 in block diagram shows the viewfinder optical system in developed form. In these figures, the same reference characters as those in the first embodiment denote the same members. In the second embodiment, the optical system for forming an erected, laterally reversed image, that is, a correct image, is in the form of an image inverting member 20 constructed with a combination of reflecting mirrors. Another feature is that the eyepiece lens 3 is constructed with a first lens 3a of positive optical power and a second lens 3b of negative optical power, totaling two lenses, both made from the same plastic material, arrangement being such that the principal point of the eyepiece lens 3 is put on the side near to the focusing screen 1, thereby preventing the finder magnification from lowering. Yet another feature is that, of the four lens surfaces of the eyepiece lens 3, the lens surface nearest to the observation side is selected to be used as the diffractive optical surface. FIGS. 8A to 8D graphically show the aberrations of the viewfinder optical system of the second embodiment.

Figure 9:
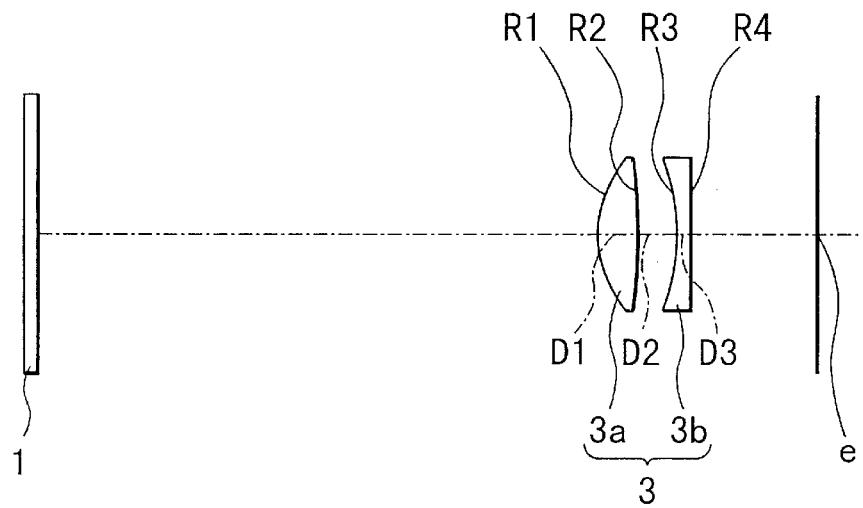
FIG. 9 is a block diagram of an analogous example 2 of an optical system analogous to the viewfinder optical system of the first embodiment except for no use of the diffractive optical surface.
Figures 10A, 10B, 10C, 10D:
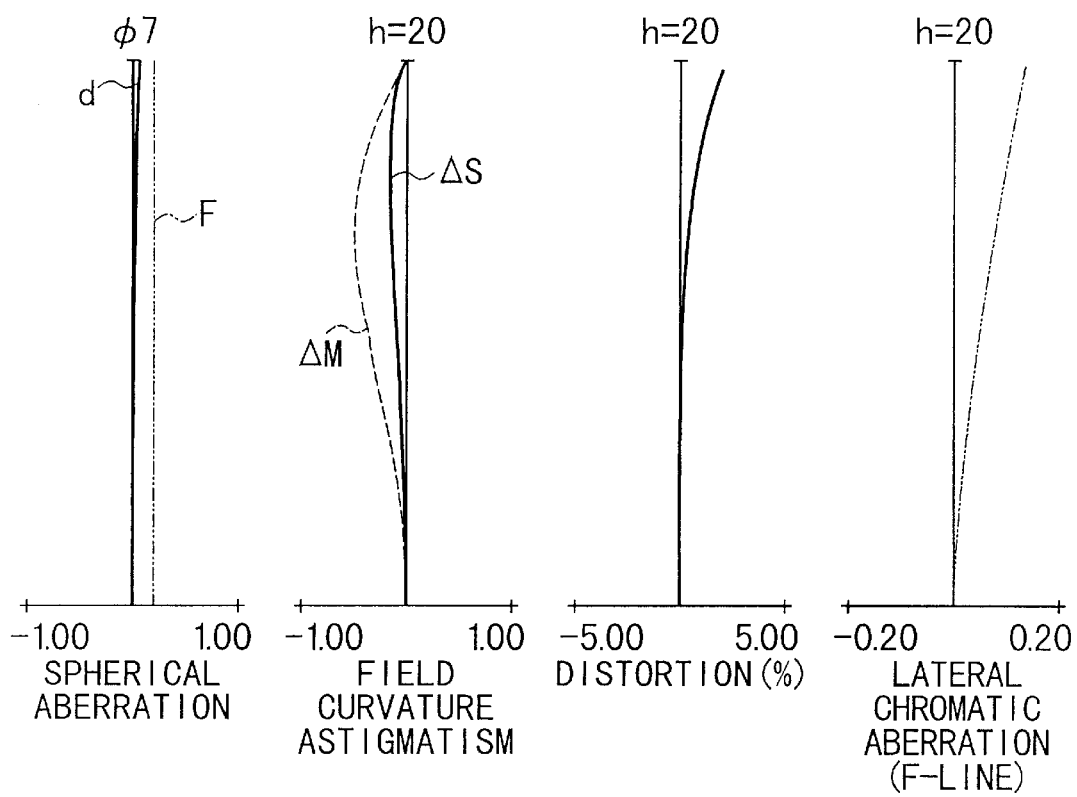
FIGS. 10A to 10D are graphic representations of the aberrations of the analogous example 2 shown in FIG. 9.

FIG. 9 in block diagram shows a viewfinder optical system (an analogous example 2 to be described later) analogous to that of the second embodiment, where no diffractive optical surface is in use. FIGS. 10A to 10D graphically show the aberrations of this optical system. As is apparent from the aberration curves of FIGS. 8A to 8D and FIGS. 10A to 10D, although the second embodiment leaves some longitudinal chromatic aberration uncorrected, the lateral chromatic aberration, in particular, is corrected well as in the first embodiment.

Figure 11:
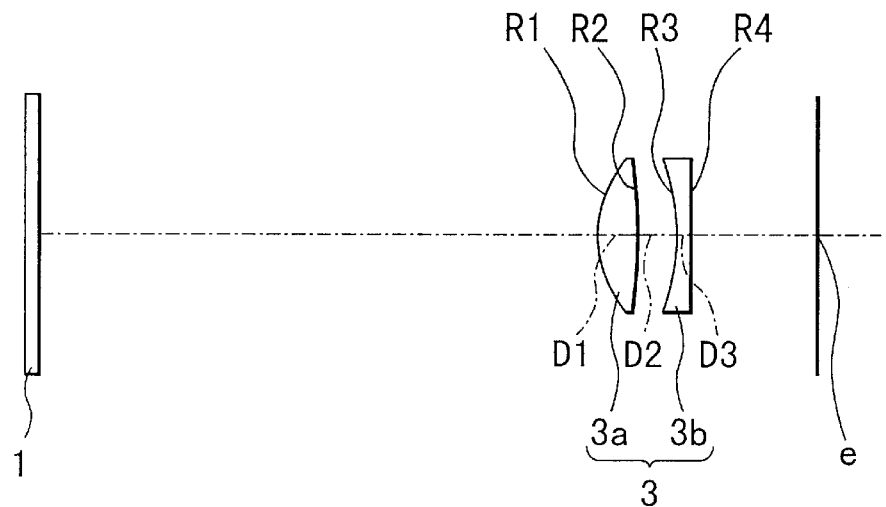
FIG. 11 is a block diagram, in developed form, of a viewfinder optical system according to a third embodiment of the invention.
Figures 12A, 12B, 12C, 12D:
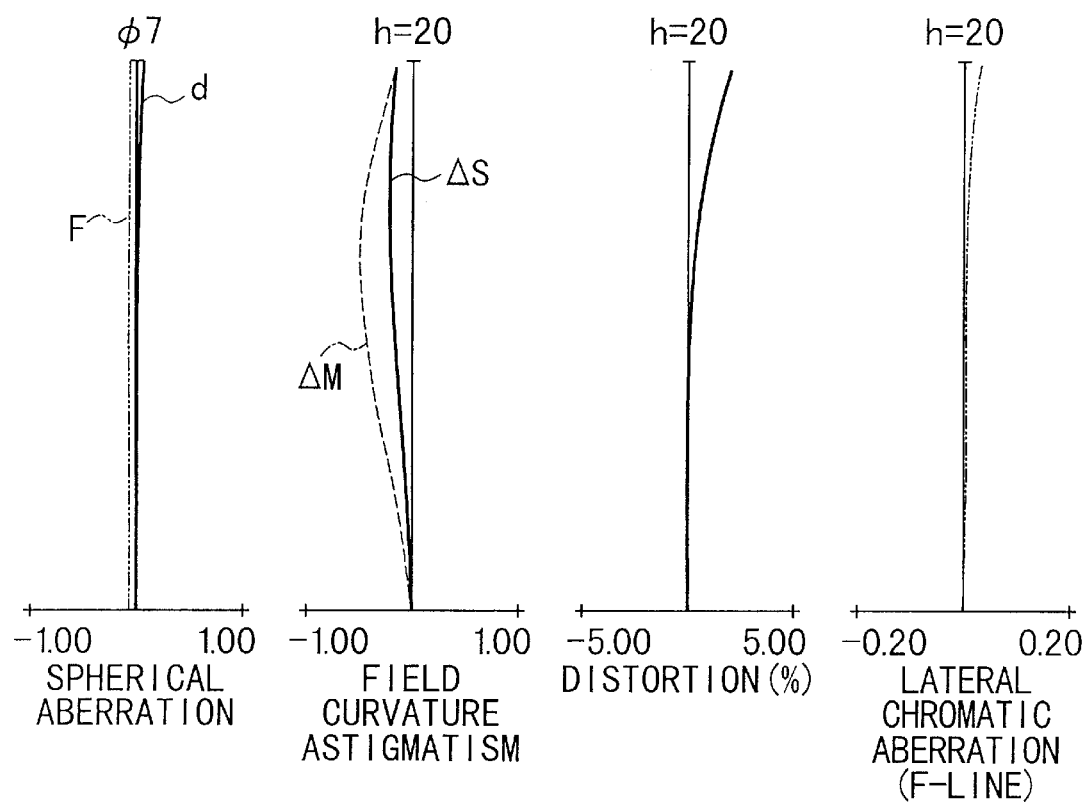
FIGS. 12A to 12D are graphic representations of the aberrations of the viewfinder optical system of the third embodiment.

FIG. 11 is a longitudinal section view, partly in developed form, of a viewfinder optical system according to a third embodiment of the invention. The third embodiment is almost similar in lens design to the second embodiment. Of the four lens surfaces of the eyepiece lens 3, the lens surface closest to the focusing screen 1 is selected to be used as the diffractive optical surface. FIGS. 12A to 12D graphically show the aberrations of the viewfinder optical system of the third embodiment, in which the longitudinal and lateral chromatic aberrations both are corrected well.

FIGS. 13A to 13C are longitudinal section views, partly in developed form, of a viewfinder optical system according to a fourth embodiment of the invention. Reference numeral 4 denotes a condenser lens. In the fourth embodiment, the optical system for forming an erecting image is in the form of an image inverting member 2 composed of a pentagonal prism. Another feature is that the eyepiece lens 3 is constructed with a first lens 3a of negative optical power and a second lens 3b of positive optical power, totaling two lenses, both made from plastic materials of the same kind, and the first lens 3a is made axially movable for adjusting the diopter of the viewfinder.

FIG. 13A shows the standard position where the diopter is approximately "−1". FIG. 13B shows another position where the diopter is approximately "−2.5". FIG. 13C shows a further position where the diopter is approximately "+0.5". Of the four lens surfaces of the eyepiece lens 3, the lens surface closest to the focusing screen 1 is used to be formed as the diffractive optical surface.

FIGS. 14A1 to 14A4, 14B1 to 14B4, and 14C1 to 14C4 graphically show the aberrations of the viewfinder optical system of the fourth embodiment in the three operative positions shown in FIGS. 13A, 13B and 13C, respectively.

FIGS. 15A to 15C in block diagram shows a viewfinder optical system which is analogous in prototype design (an analogous example 4 to be described later) to that of the fourth embodiment, but differs in that no diffractive optical surface is in use. FIGS. 15A to 15C correspond to the operative positions shown in FIGS. 13A to 13C, respectively. FIGS. 16A1 to 16A4, 16B1 to 16B4 and 16C1 to 16C4 graphically show the aberrations of this optical system, corresponding to FIGS. 14A1 to 14A4, 14B1 to 14B4 and 14C1 to 14C4, respectively.

As is apparent from the comparison of FIGS. 16A1 to 16A4, 16B1 to 16B4 and 16C1 to 16C4 with FIGS. 14A1 to 14A4, 14B1 to 14B4 and 14C1 to 14C4, the fourth embodiment is corrected well particularly for lateral chromatic aberration at any position (any diopter) as in the third embodiment.

Although the first to fourth embodiments have been described in connection with the eyepiece lens 3 made from acrylic resin, variations may be made by using styrene resin or polycarbonate resin. As optical glass materials are suited to the substrate on which to form the diffractive optical surface, the use of the glass materials may be considered, of course. Also, two or more lens elements of different optical materials may be used in the eyepiece lens 3.

Figure 17:
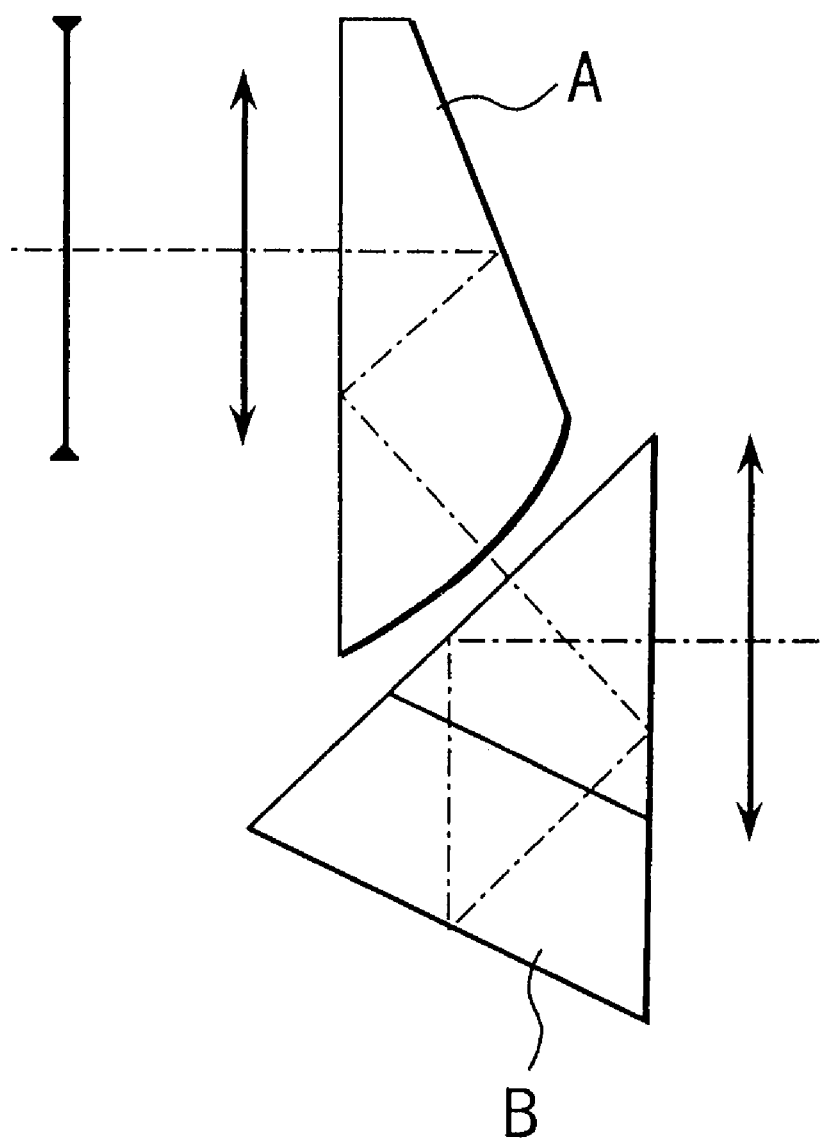
FIG. 17 is a diagram of the construction of a real image type viewfinder optical system.

FIG. 17 shows a real image type viewfinder optical system using a Peshan roof prism as the image inverting optical system. The image inverting optical system may otherwise be formed to a porro-prism, porro-mirror or the like. In this case, the diffractive optical surface may be added not only to the lenses of the eyepiece optical system between the primary image plane and the observer's pupil "e" and the cover glass, but also to the porro-prism or roof prism. Even if so, the same results are obtained.

Figure 18:
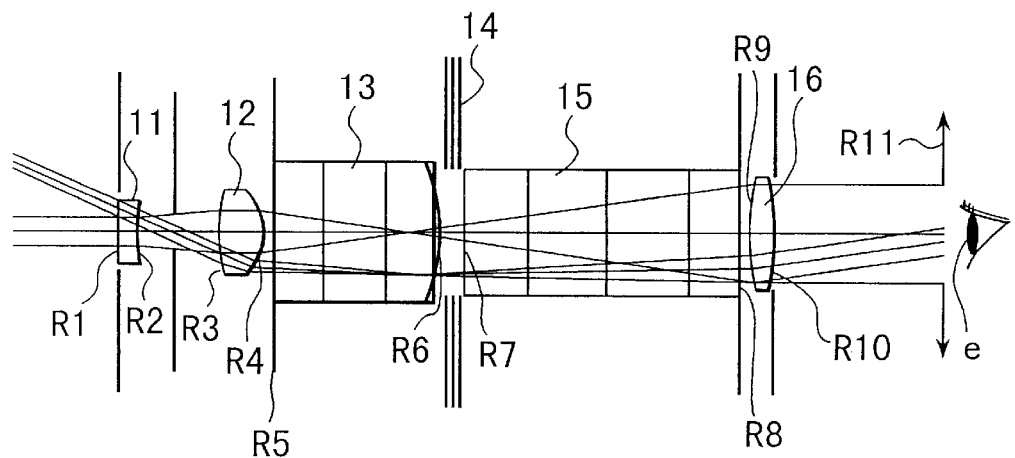
FIG. 18 is a block diagram, in developed form, of a viewfinder optical system according to a fifth embodiment of the invention.
Figures 19A, 19B, 19C, 19D:
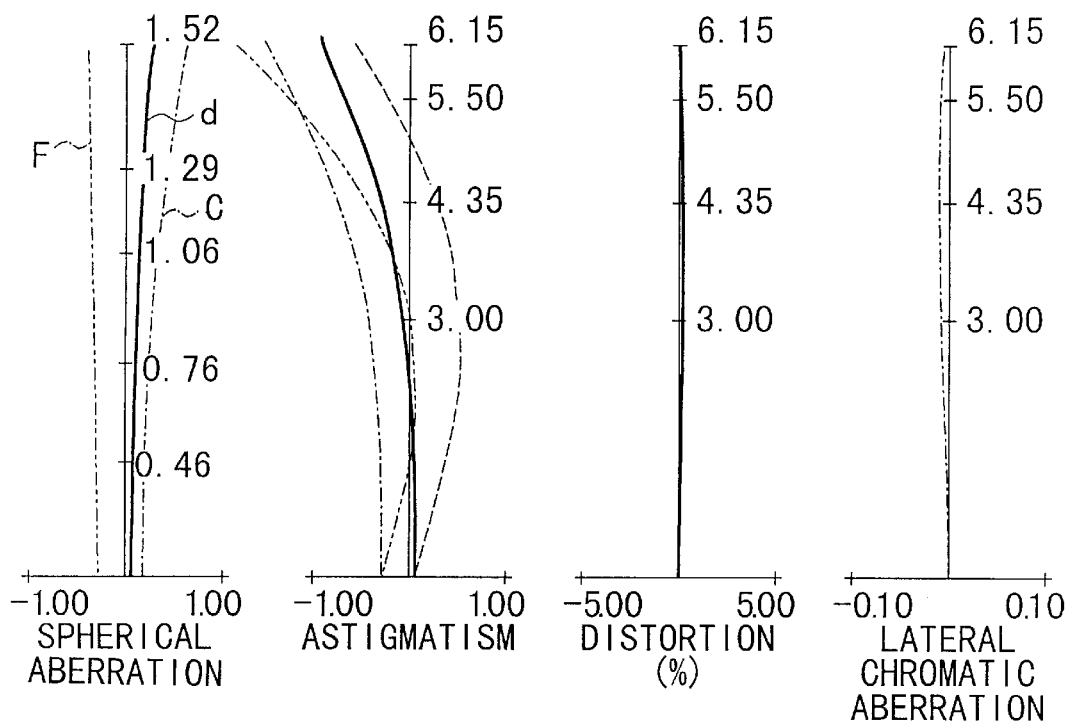
FIGS. 19A to 19D are graphic representations of the aberrations of the viewfinder optical system of the fifth embodiment.

FIG. 18 is a longitudinal section view in developed form of a viewfinder optical system according to a fifth embodiment of the invention. In FIG. 18, an objective optical system is composed of lenses 11 and 12. An optical element 13 prism, such as the prism A shown in FIG. 17, and also serves as a field lens, being depicted linearly for the purpose of convenience. The objective optical system (lenses 11 and 12) forms a first image on a plane adjacent to a field-of-view frame 14. At the periphery of the field-of-view frame 4 there are displayed shutter speed and aperture size scales, AF information and others by a liquid crystal panel and LEDs. An image inverting prism 15 corresponds to the Peshan roof prism B shown in FIG. 17, being depicted linearly for the purpose of convenience in FIG. 18. Looking through an eyepiece lens 16, the eye "e" observes the field-of-view image, the field-of-view frame 14 the various pieces of information displayed outside the field-of-view frame 14.

In the real image type viewfinder, the field-of-view image at the primary image plane of the objective optical system (lenses 11 and 12) and the field-of-view frame 14 that limits the field of view are simultaneously observed through the eyepiece optical system. Therefore, good visibility of the field-of-view image and good visibility of the field-of-view frame 14 and the display are required. To make these consistent together, the diffractive optical surface has to be used in a surface that has a curvature in the eyepiece optical system. By this arrangement, it becomes possible to reduce the longitudinal and lateral chromatic aberrations.

This is because the chromatic aberrations of the eyepiece optical system are produced at any surface of curvature. So, if the diffractive optical surface is used in that surface, the chromatic aberrations can be corrected by the same surface. Therefore, this is advantageous at correcting the aberrations. Moreover, the fact that the diffractive optical surface is given a curvature makes it possible to correct well spherical aberration, coma and aberrations other than the chromatic aberrations by limiting the number of lens elements to a minimum.

Then, the diffractive optical surface in the eyepiece optical system has a diffracting action with an optical power $\psi d$ and a refracting action with an optical power $\psi r$. It is preferred that the ratio of these powers lie in the following range:

$$0.02 < |\psi d/\psi r| < 0.60 \qquad (6)$$

When the lower limit of the condition (6) is exceeded, it becomes difficult to correct the longitudinal and lateral chromatic aberrations in good balance. Conversely, when the upper limit is exceeded, it becomes difficult to correct coma and lateral chromatic aberration in good balance. Also, in a case where the lenses to be used in the eyepiece optical system are plastic ones, because the materials have no degree of freedom and all the available materials are lower in refractive index than the glass materials, the lenses are only of positive refractive powers. So, achromatism is difficult to make. Also, the plastic lenses are manufactured by die molding. Therefore, by adding a die for the diffracting optical surface to the. die for the lens surface, manufacturing can be carried out with ease. For the eyepiece optical system using the plastic lenses, it is, therefore, preferred to use the diffractive optical surface.

Since the eyepiece optical system is apt to be easily damaged by entrance of dust or moisture, a parallel flat plate is often provided as the cover glass. Also, since the diffractive optical surface is manufactured by die molding or replica casting, there is need to make a master die. Because fine grooves must be ruled with a high precision accuracy, the flat surface can be manufactured with a higher accuracy than the surface of curvature and at a better productivity. Therefore, the addition of the diffractive optical surface to the parallel flat plate of the eyepiece optical system is advantageous at manufacturing.

Also, to increase the optical performance for the purpose of improving the good visibility of the field-of-view image, the field-of-view frame 14 and the outside display thereof, not only the eyepiece optical system uses the diffractive optical surface, but also the objective optical system (lenses 11 and 12) is provided with a diffractive optical surface in one of the surfaces thereof, as in the fifth embodiment.

Also, letting the optical power of the entirety of the eyepiece optical system be denoted by Wie and the optical power of the diffractive optical surface be denoted by $\psi d$, it is preferred to satisfy the following condition:

$$0.02 < |\psi d/\psi e| < 0.15 \qquad (7)$$

When the lower limit of the condition (7) is exceeded, the longitudinal chromatic aberration is under-corrected and its balance with the lateral chromatic aberration becomes worse. When the upper limit is exceeded, the chromatic aberrations are over-corrected and their balance with other aberrations, for example, spherical aberration, becomes worse.

Further, in a case where two diffractive optical surfaces are respectively put into the objective optical system (lenses 11 and 12) and the eyepiece optical system, letting the optical powers of the objective optical system (lenses 11 and 12) and the eyepiece optical system be denoted by ψo and ψd, respectively, it is preferred that the ratio thereof lie within the following range:

$$0.08 < |\psi d/\psi o| < 0.4 \qquad (8)$$

When the lower limit of the condition (8) is exceeded, the lateral chromatic aberration of the image of the field-of-view frame 14 and the outside display thereof deteriorates. When the upper limit is exceeded, the longitudinal chromatic aberration of the field-of-view image increases greatly, causing the visibility to deteriorate.

The fifth embodiment is exemplified by a numerical example 5 to be described later. FIGS. 19A to 19D graphically show the aberrations of the numerical example 5. It is to be noted that, although, as described before, the fifth embodiment has the diffractive optical surfaces in both of the eyepiece optical system and the objective optical system (lenses 11 and 12), the following sixth to eighth embodiments have their diffractive optical surfaces only in the eyepiece optical systems.

Figure 20:
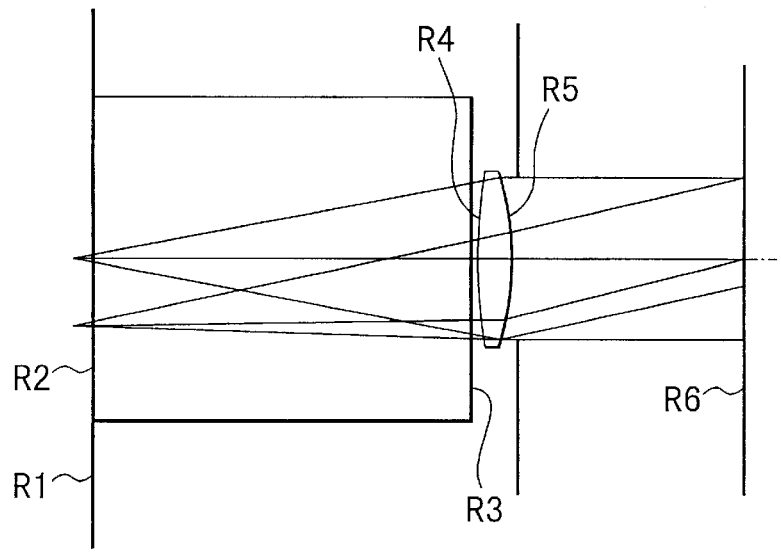
FIG. 20 is a block diagram, in developed form, of a viewfinder optical system according to a sixth embodiment of the invention.
Figures 21A, 21B, 21C, 21D:
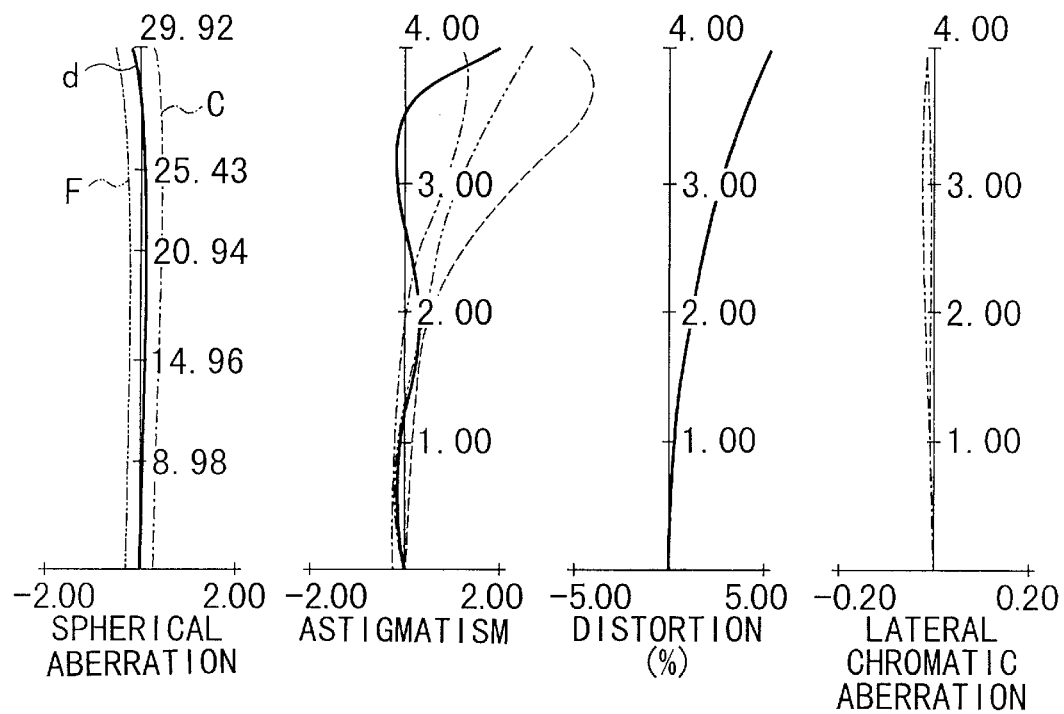
FIGS. 21A to 21D are graphic representations of the aberrations of the viewfinder optical system of the sixth embodiment.
Figure 24:
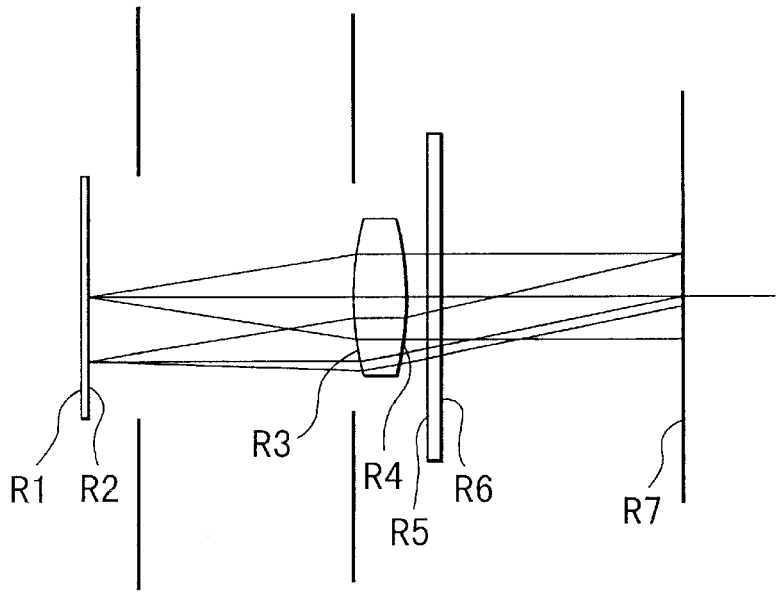
FIG. 24 is a block diagram, in developed form, of a viewfinder optical system according to an eighth embodiment of the invention.
Figures 25A, 25B, 25C, 25D:
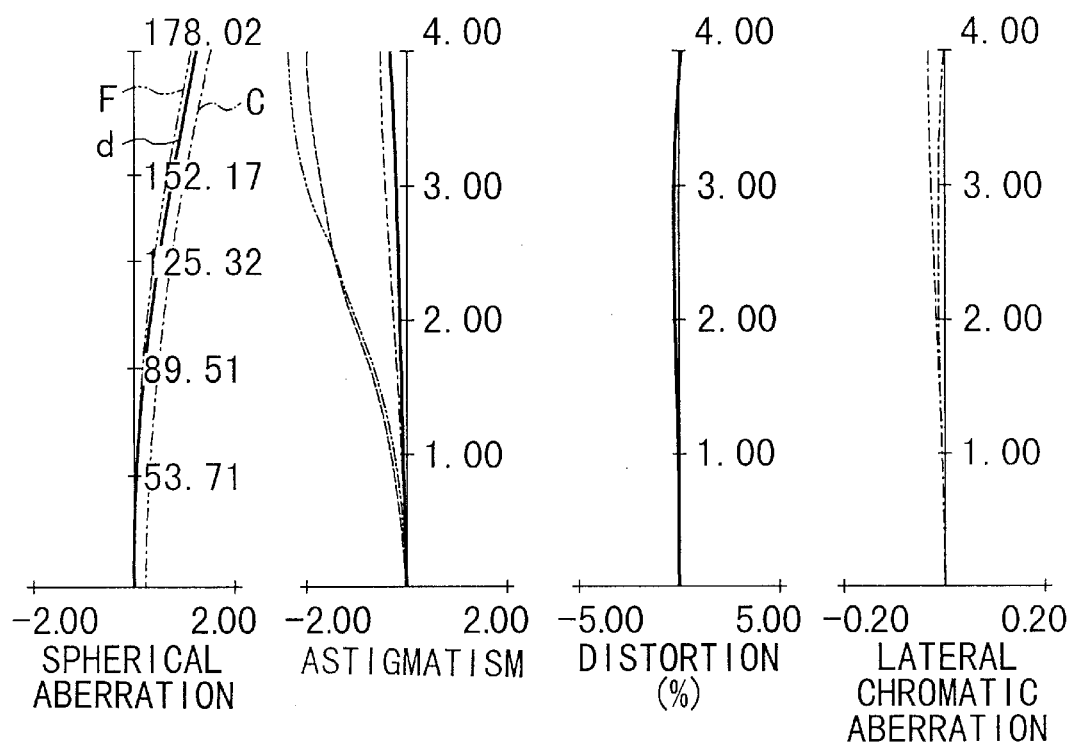
FIGS. 25A to 25D are graphic representations of the aberrations of the viewfinder optical system of the eighth embodiment.

FIG. 20, FIG. 22 and FIG. 24 are longitudinal section views in developed form of viewfinder optical systems according to the sixth to eighth embodiments of the invention, respectively. FIGS. 21A to 21D, 23A to 23D and 25A to 25D graphically show the aberrations of the sixth to eighth embodiments, respectively.

Eight numerical examples 1 to 8 corresponding to the first to eighth embodiments are shown below. In the numerical data for the examples 1 to 8, Ri and Di are respectively the radius of curvature of the i-th lens surface and the i-th lens thickness or air separation, when counted from the object side, and Ni and νi are respectively the refractive index and Abbe number of the material of the i-th lens element, when counted from the object side. It is to be noted that the ⊙-headed and *-headed lens surface numbers represent the diffractive optical surface and the aspheric surface, respectively.

The aspheric surface is defined by the following expression:

$$X = \frac{(H^2/R)}{1 + \sqrt{1 - (1+K)(H/R)^2}} + BH^4 + CH^6 + DH^8$$

where X is the axial distance from the lens vertex, H is the height from the optical axis, R is the radius of the osculating sphere, and K, B, C and D are the aspheric coefficients.

Numerical Example 1:

| | | | |
|---|---|---|---|
| R1 = ∞ | D1 = 80.00 | N1 = 1.51633 | ν1 = 64.2 |
| R2 = ∞ | D2 = 8.00 | | |
| R3 = 37.833 | D3 = 4.00 | N2 = 1.49171 | ν2 = 57.4 |
| ⊙R4 = ∞ | D4 = 20.00 | | |

Phase Coefficients:

R4: C2 = −8.23947 · 10⁻⁵   C4 = 7.99557 · 10⁻⁸
ψ_B/ψ_E = 0.011

Analogous example 1:

| | | | |
|---|---|---|---|
| R1 = ∞ | D1 = 80.00 | N1 = 1.51633 | ν1 = 64.2 |
| R2 = ∞ | D2 = 8.00 | | |
| R3 = 37.833 | D3 = 4.00 | N2 = 1.49171 | ν2 = 57.4 |
| R4 = −298.820 | D4 = 20.00 | | |

Numerical Example 2:

| | | | |
|---|---|---|---|
| *R1 = 21.482 | D1 = 5.00 | N1 = 1.49171 | ν1 = 57.4 |
| R2 = −158.629 | D2 = 7.00 | | |
| *R3 = −25.849 | D3 = 2.00 | N2 = 1.49171 | ν2 = 57.4 |
| ⊙R4 = ∞ | D4 = 18.00 | | |

Aspheric Coefficients:

R1: K = 5.89278 · 10⁻¹   B = 1.08006 · 10⁻⁶   C = 6.55616 · 10⁻⁸
R3: K = −1.49180 · 10⁻¹   B = −1.44649 · 10⁻⁴   C = 5.85247 · 10⁻⁷

Phase Coefficients:

R4:   C2 = −1.58218 · 10⁻⁴   C4 = −5.75880 · 10⁻⁷
      C6 = −1.87843 · 10⁻⁹   C8 = 2.30930 · 10⁻¹⁰

ν1/ν2 = 1.0
ψ_B/ψ_E = 0.024

Analogous example 2:

| | | | |
|---|---|---|---|
| *R1 = 22.802 | D1 = 5.00 | N1 = 1.49171 | ν1 = 57.4 |
| R2 = −142.593 | D2 = 7.00 | | |
| *R3 = −32.383 | D3 = 2.00 | N2 = 1.49171 | ν2 = 57.4 |
| R4 = ∞ | D4 = 18.00 | | |

Aspheric Coefficients:

R1: K = 7.63793 · 10⁻¹   B = −5.94954 · 10⁻⁶   C = 4.12607 · 10⁻⁸
R3: K = −1.09402 · 10⁻¹   B = −5.548131 · 10⁻⁵   C = −3.80842 · 10⁻⁸

Numerical Example 3:

| | | | |
|---|---|---|---|
| ⊙*R1 = 24.038 | D1 = 5.00 | N1 = 1.49171 | ν1 = 57.4 |
| R2 = −173.101 | D2 = 7.00 | | |
| *R3 = −33.925 | D3 = 2.00 | N2 = 1.49171 | ν2 = 57.4 |
| R4 = ∞ | D4 = 18.00 | | |

Aspheric Coefficients:

R1: K = 8.79588 · 10⁻¹   B = −5.13271 · 10⁻⁶   C = 5.83616 · 10⁻⁸
R3: K = −1.45726 · 10⁻¹   B = −6.35169 · 10⁻⁵   C = 3.50174 · 10⁻⁸

Phase Coefficients:

R1:   C2 = −7.13625 · 10⁻⁵   C4 = −1.85582 · 10⁻⁸
      C6 = 3.39349 · 10⁻¹⁰   C8 = 2.68825 · 10⁻¹²

ν1/ν2 = 1.0
ψ_B/ψ_E = 0.011

Numerical Example 4:

| | | | |
|---|---|---|---|
| R1 = ∞ | D1 = 4.50 | N1 = 1.49171 | ν1 = 57.4 |
| R2 = −70.000 | D2 = 1.00 | | |
| R3 = ∞ | D3 = 80.00 | N2 = 1.51633 | ν2 = 64.2 |
| R4 = ∞ | D4 = Variable | | |
| ⊙R5 = 102.778 | D5 = 1.20 | N3 = 1.49171 | ν3 = 57.4 |
| R6 = 25.623 | D6 = Variable | | |
| R7 = 23.569 | D7 = 4.00 | N4 = 1.49171 | ν4 = 57.4 |
| R8 = −126.762 | D8 = 20.00 | | |

| Variable | Diopter | | |
|---|---|---|---|
| Separation | −1 | −2.5 | +0.5 |
| D4 | 4.50 | 8.00 | 1.00 |
| D6 | 4.50 | 1.00 | 8.00 |

Phase Coefficients:

R5: C2 = −8.16636 · 10⁻⁵   C4 = 1.75309 · 10⁻⁷   C6 = 2.97670 · 10⁻¹⁰
ν1/ν2 = 1.0
ψ_B/ψ_E = 0.012

Analogous example 4:

| | | | |
|---|---|---|---|
| R1 = ∞ | D1 = 4.50 | N1 = 1.49171 | ν1 = 57.4 |
| R2 = −70.000 | D2 = 1.00 | | |
| R3 = ∞ | D3 = 80.00 | N2 = 1.51633 | ν2 = 64.2 |
| R4 = ∞ | D4 = Variable | | |
| R5 = 68.055 | D5 = 1.20 | N3 = 1.49171 | ν3 = 57.4 |
| R6 = 24.081 | D6 = Variable | | |
| R7 = 25.622 | D7 = 4.00 | N4 = 1.49171 | ν4 = 57.4 |
| R8 = −88.075 | D8 = 20.00 | | |

| Variable | Diopter | | |
|---|---|---|---|
| Separation | −1 | −2.5 | +0.5 |
| D4 | 4.50 | 8.00 | 1.00 |
| D6 | 4.50 | 1.00 | 8.00 |

-continued

Numerical Example 5:

| | f = −11.18 | 2ω = 58° | Exit Pupil Diameter = φ10 | |
|---|---|---|---|---|
| ⊚*R1 = 11.833 | D1 = 1.30 | N1 = 1.49171 | ν1 = 57.4 |
| R2 = 5.239 | D2 = 7.40 | | |
| *R3 = 14.313 | D3 = 3.70 | N2 = 1.49171 | ν2 = 57.4 |
| *R4 = −4.576 | D4 = 1.10 | | |
| R5 = ∞ | D5 = 13.69 | N3 = 1.52470 | ν3 = 56.2 |
| R6 = −20.000 | D6 = 2.50 | | |
| R7 = ∞ | D7 = 24.00 | N4 = 1.57090 | ν4 = 33.8 |
| R8 = ∞ | D8 = 0.70 | | |
| *R9 = 18.520 | D9 = 2.35 | N5 = 1.49171 | ν5 = 57.4 |
| ⊚R10 = −21.979 | D10 = 15 | | |
| R11 = Eye Point | | | |

Aspheric Coefficients:

| R1: | K = −6.03204 · 10⁻¹ | B = 7.866 · 10⁻⁴ |
|---|---|---|
| | C = 1.479 · 10⁻⁴ | D = 0 |
| R3: | K = −2.22453 · 10 | B = 1.96097 · 10⁻⁴ |
| | C = −3.97632 · 10⁻⁵ | D = 1.67558 · 10⁻⁶ |
| R4: | K = −6.98645 · 10⁻¹ | B = 5.64056 · 10⁻⁴ |
| | C = −2.23308 · 10⁻⁵ | D = 5.27199 · 10⁻⁶ |
| R9: | K = 1.0253 · 10⁻¹ | B = −8.46894 · 10⁻⁵ |
| | C = −2.01808 · 10⁻⁷ | D = 0 |

Phase Coefficients:

| R1: | C2 = 1.66027 · 10⁻² | C4 = −1.49828 · 10⁻³ |
|---|---|---|
| | C6 = 9.35684 · 10⁻⁵ | |
| R10: | C2 = −2.9038 · 10⁻³ | C4 = 5.27868 · 10⁻⁵ |
| | C6 = −9.74562 · 10⁻⁸ | |

$|\psi d/\psi e|$ = 0.11
$|\psi d/\psi o|$ = 0.17
$|\psi d/\psi r|$ = 0.260
$\psi d$ = −5.8076 · 10⁻³
$\psi r$ = 2.237 · 10⁻²

Numerical Example 6:

| | f = 18.67 | 2ω = 24.2° | Exit Pupil Diameter = φ7 | |
|---|---|---|---|---|
| R1 = Primary IP** | D1 = 1.44 | | |
| R2 = ∞ | D2 = 24.00 | N1 = 1.57090 | ν1 = 33.8 |
| R3 = ∞ | D3 = 0.45 | | |
| *R4 = 31.645 | D4 = 2.35 | N2 = 1.49171 | ν2 = 57.4 |
| ⊚R5 = −13.621 | D5 = 15.00 | | |
| R6 = Eye Point | | | |
| **) Image plane | | | |

$\psi d$ = −2.866 · 10⁻³    $|\psi d/\psi r|$ = 0.079
$\psi r$ = 3.61 · 10⁻²    $|\psi d/\psi e|$ 0.054

Aspheric Coefficients:

| R4: | K = 1.0253 · 10⁻¹ | B = −8.46894 · 10⁻⁵ |
|---|---|---|
| | C = −2.01808 · 10⁻⁷ | D = 0 |

Phase Coefficients:

| R5: | C2 = −1.43312 · 10⁻³ | C4 = −7.89081 · 10⁻⁶ |
|---|---|---|
| | C6 = −6.6522 · 10⁻⁸ | |

Numerical Example 7:

| | f = 17.50 | 2ω = 25.8° | Exit Pupil Diameter = φ7 | |
|---|---|---|---|---|
| R1 = Primary IP | D1 = 0.40 | N1 = 1.52300 | ν1 = 58.6 |
| R2 = ∞ | D2 = 15.58 | | |
| *R3 = 16.994 | D3 = 3.5 | N2 = 1.49171 | ν2 = 57.4 |
| ⊚R4 = −18.417 | D4 = 1.11 | | |
| R5 = ∞ | D5 = 0.7 | N3 = 1.52300 | ν3 = 58.6 |
| R6 = ∞ | D6 = 15 | | |
| R7 = Eye Point | | | |

$\psi d$ = −3.56 · 10⁻³    $|\psi d/\psi r|$ = 0.133
$\psi r$ = 2.67 · 10⁻²    $|\psi d/\psi e|$ = 0.062

Aspheric Coefficients:

| R3: K = −4.4 | B = 0 | C = −5.0 · 10⁻⁸ | D = 0 |
|---|---|---|---|

Phase Coefficients:

| R4: | C2 = −1.78218 · 10⁻³ | C4 = 3.29683 · 10⁻⁶ |
|---|---|---|
| | C6 = 2.6837 · 10⁻⁸ | |

Numerical Example 8:

| | f = 17.50 | 2ω = 25.8° | Exit Pupil Diameter = φ7 | |
|---|---|---|---|---|
| R1 = Primary IP | D1 = 0.40 | N1 = 1.52300 | ν1 = 58.6 |
| R2 = ∞ | D2 = 15.63 | | |
| *R3 = 15.281 | D3 = 3.50 | N2 = 1.49171 | ν2 = 57.4 |
| R4 = −20.808 | D4 = 1.11 | | |
| ⊚R5 = ∞ | D5 = 0.70 | N3 = 1.52300 | ν3 = 58.6 |
| R6 = ∞ | D6 = 15.00 | | |
| R7 = Eye Point | | | |

$|\psi d/\psi e|$ = 0.063

Aspheric Coefficients:

| R3: K = −4.4 | B = 0 | C = −5.0 · 10⁻⁸ | D = 0 |
|---|---|---|---|

Phase Coefficients:

| R5: | C2 = −1.80317 · 10⁻³ | C4 = −5.32565 · 10⁻⁶ |
|---|---|---|
| | C6 = −1.29262 · 10⁻⁷ | |

Figure 26:
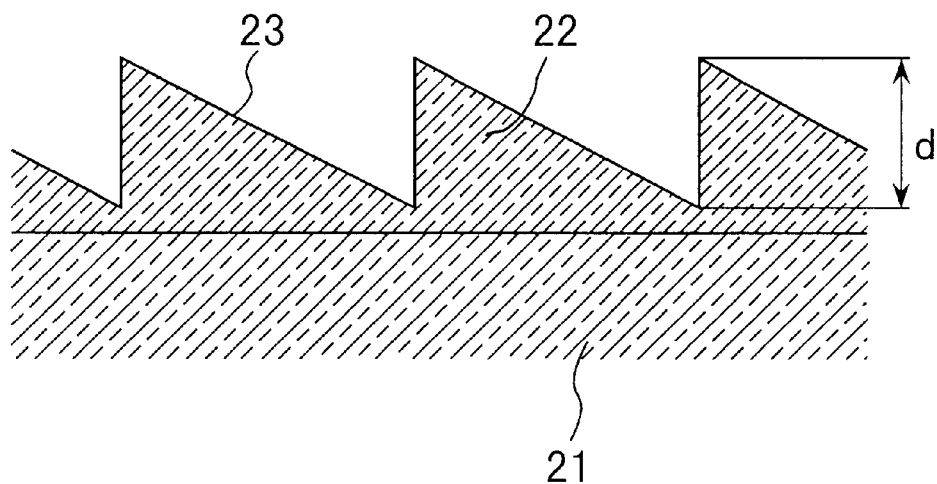
FIG. 26 is a sectional view of a diffractive optical surface of mono-layer structure.
Figure 27:
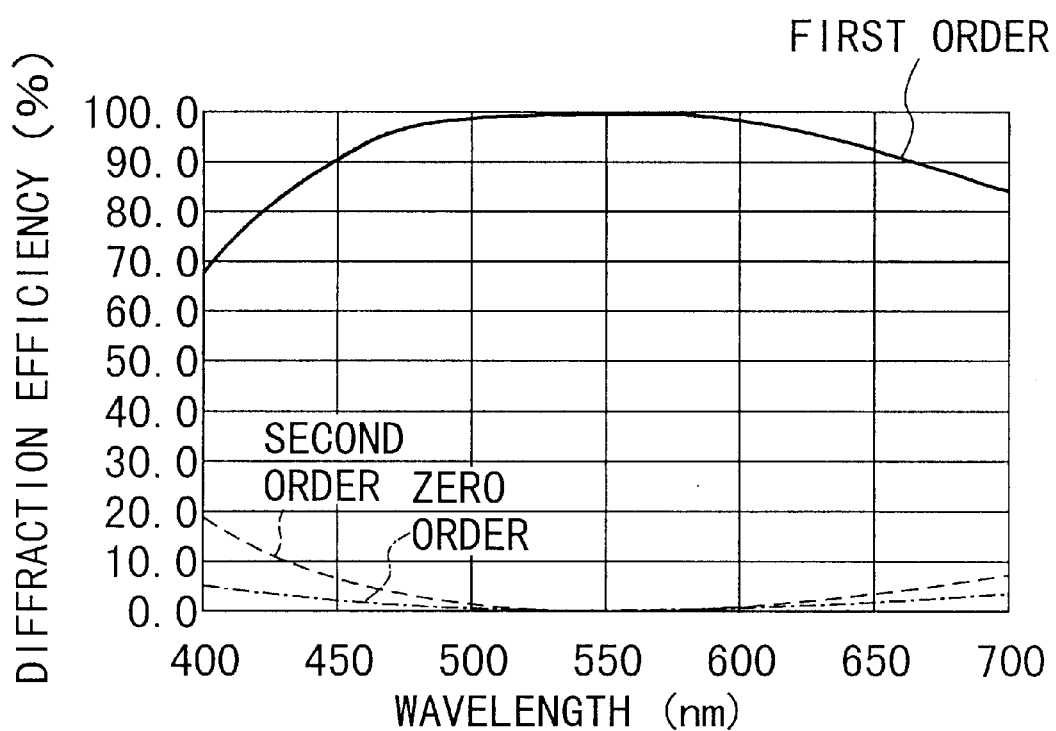
FIG. 27 is a graph of the diffraction efficiency of the diffractive optical surface of mono-layer structure.

In each of the embodiments described above, the diffraction grating in the diffractive optical surface is of the kinoform shown in FIG. 26. A process for producing such a diffraction grating comprises the steps of applying a layer 22 of ultraviolet setting resin to the surface of a substrate 21 and then forming on the layer 22 a diffraction grating 23 of such a thickness "d" that the diffraction efficiency for the first-order diffracted ray becomes 100% at a wavelength of 530 nm. FIG. 27 is a graph of the wavelength-dependent characteristics of the first-order diffraction efficiency of the diffractive optical surface shown in FIG. 26. As is apparent from FIG. 27, the diffraction efficiency in the design order becomes progressively lower away from the optimized wavelength of 530 nm. On the other hand, the intensities of diffracted rays in the orders near to the design order, namely, zero and second orders, rise increasingly. This increase of the intensities of diffracted rays in orders other than the design order causes production of flare and leads to lower the resolving power of the optical system.

Figure 28:
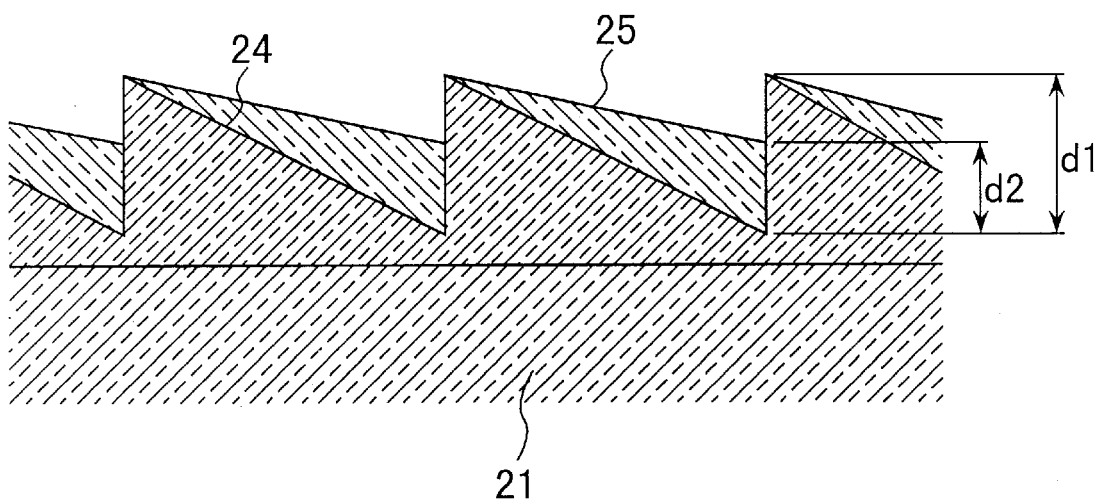
FIG. 28 is a sectional view of the construction of a diffractive optical surface with two layers in laminated form.
Figure 29:
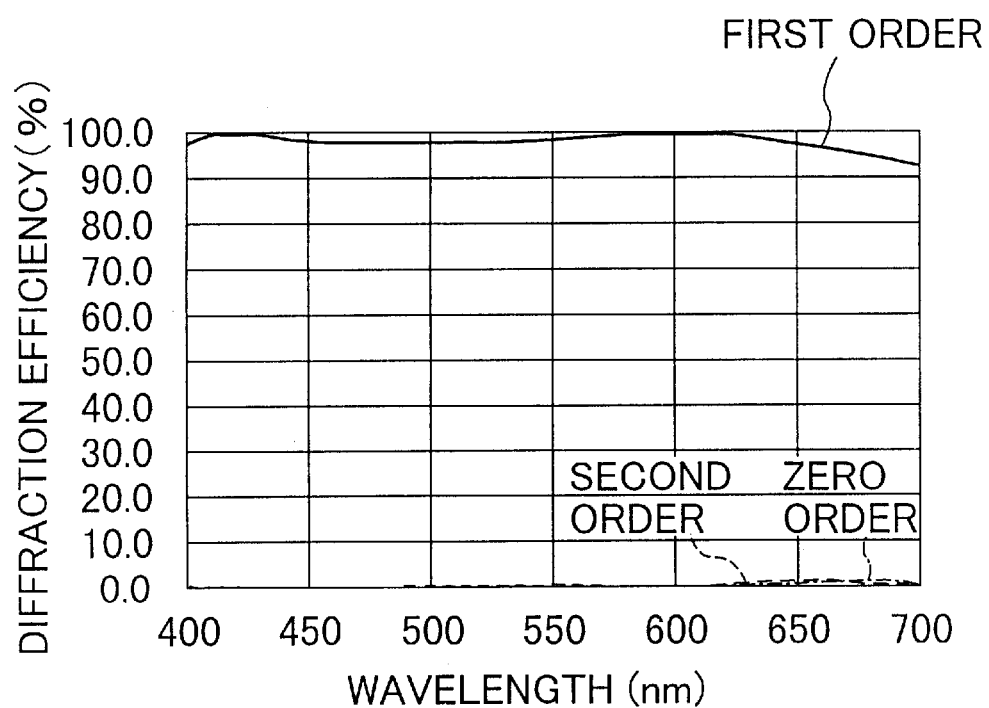
FIG. 29 is a graph of the diffraction efficiency of the diffractive optical surface of laminated structure.

Therefore, as another example of the form of the diffraction grating, a laminated type of diffraction grating shown in FIG. 28 may be used. In a specific X structure, a first diffraction grating 24 made from an ultraviolet setting resin (Nd=0.499, νd=54) is formed on the substrate 21. As stacked on the first diffraction grating 24, a second diffraction grating 25 made from another ultraviolet setting resin (Nd=1.598, νd=28) is formed. In this combination of the materials, the thickness d1 of the first diffraction grating 24 is determined to be d1=13.8 μm and the thickness d2 of the second diffraction grating 25 is determined to be d2=10.5 μm. FIG. 29 shows the wavelength-dependent characteristics of the first-order diffraction efficiency of the diffractive optical surface of the form shown in FIG. 28. By making the diffraction grating in the laminated structure, the diffraction efficiency for the design order is increased to higher than 95% over the entire useful range of wavelengths. By using such a diffraction grating of the laminated structure, the MTF (Modulation Transfer Function) in the low frequencies is improved. The desired MTF characteristic is thus obtained. As will be seen from the above, the use of the diffraction grating of the laminated structure achieves further improvements of the optical performance.

Figure 30:
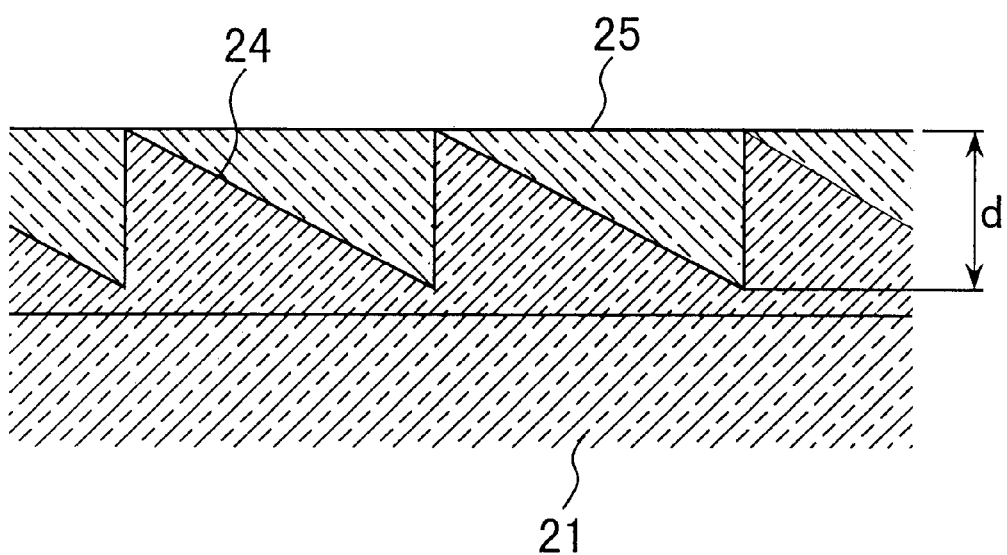
FIG. 30 is a sectional view of the construction of another diffractive optical surface with two layers in laminated form.

It should be noted that, for the diffraction grating of the laminated structure described above, the material to be used is not limited to the ultraviolet setting resin. Other plastic materials may be used instead. Moreover, depending on some materials of the substrate, the first diffraction grating 24 may be formed directly on the substrate 21. Furthermore, there is no need to differentiate the thicknesses of the two grating layers from each other. In some combinations of materials, the thicknesses of the two diffraction gratings 24 and 25 may be made equal to each other, as shown in FIG. 30. Since, in this case, no grooves are exposed out of the diffractive optical surface, the dust proof is excellent, contributing to an increase of the productivity on the assembling line in manufacturing the diffractive optical elements. So, more inexpensive optical systems can be obtained.

It will be appreciated from the foregoing that the viewfinder optical system in each of the embodiments is constructed in a simple form and in a low cost. Moreover, the chromatic aberrations the eyepiece lens produces are corrected particularly well. So, the viewfinder is made more comfortable to look through.

Also, the viewfinder optical system in each of the embodiments has its eyepiece optical system provided with the diffractive optical surface to thereby improve the quality of the images of the field-of-view frame and the outside display thereof and the field-of-view image. So, with the viewfinder left in a compact form, the visibility becomes better.

What is claimed is:

1. A viewfinder optical system comprising:
    an image inverting optical unit for inverting an image formed by an objective optical unit, said image inverting optical unit inverting the image by using a reflecting function; and
    an eyepiece optical unit on which light from said image inverting optical unit is made incident, said eyepiece optical unit consisting of one lens element and having a diffractive optical surface formed on said one lens element.

2. A viewfinder optical system comprising:
    an image inverting optical unit for inverting an image formed by an objective optical unit, said image inverting optical unit inverting the image by using a reflecting function; and
    an eyepiece optical unit on which light from said image inverting optical unit is made incident, said eyepiece optical unit consisting of two lens elements and having a diffractive optical surface formed on at least one of said two lens elements.

3. A viewfinder optical system according to claim 2, wherein said two lens elements are a lens element of positive optical power and a lens element of negative optical power.

4. A viewfinder optical system according to claim 3, satisfying the following condition:

$$0.8 < v_1/v_2 < 1.25$$

where $v_1$ is an Abbe number of one of said two lens elements, and $v_2$ is an Abbe number of the other of said two lens elements.

5. A viewfinder optical system comprising:
    an image inverting optical unit for inverting an image formed by an objective optical unit, said image inverting optical unit inverting the image by using a reflecting function; and
    an eyepiece optical unit on which light from said image inverting optical unit is made incident, said eyepiece optical unit having a diffractive optical surface, said viewfinder optical system satisfying the following condition:

$$0.005 < \Sigma \psi_{Bi}/\psi_E < 0.040$$

where $\psi_E$ is an optical power of said eyepiece optical unit, and $\psi_{Bi}$ is a paraxial optical power of the i-th diffractive optical surface.

6. A viewfinder optical system comprising:
    an image inverting optical unit for inverting an image formed by an objective optical unit, said image inverting optical unit inverting the image by using a reflecting function; and
    an eyepiece optical unit on which light from said image inverting optical unit is made incident, said eyepiece optical unit having a diffractive optical surface formed on a curved surface thereof, and
    wherein said viewfinder optical system satisfies the following condition:

$$0.02 < |\psi d/\psi r| < 0.60$$

where $\psi_d$ is an optical power by a diffracting action of said diffractive optical surface, and $\psi r$ is an optical power by a refracting action of said curved surface.

7. A viewfinder optical system comprising:
    an image inverting optical unit for inverting an image formed by an objective optical unit, said image inverting optical unit inverting the image by using a reflecting function; and
    an eyepiece optical unit on which light from said image inverting optical unit is made incident, said eyepiece optical unit having a diffractive optical surface,
    said viewfinder optical system satisfying the following condition:

$$0.02 < |\psi d/\psi e| < 0.15$$

where $\psi d$ is an optical power of said diffractive optical surface, and $\psi e$ is an optical power of said eyepiece optical unit.

8. A viewfinder optical system comprising:
    an image inverting optical unit for inverting an image formed by an objective optical unit, said image inverting optical unit inverting the image by using a reflecting function; and
    an eyepiece optical unit on which light from said image inverting optical unit is made incident, said eyepiece optical unit having a parallel flat plate and a diffractive optical surface formed on said parallel flat plate.

9. A viewfinder optical system comprising:
    an objective optical unit;
    an image inverting optical unit for inverting an image formed by said objective optical unit, said image inverting optical unit inverting the image by using a reflecting function; and
    an eyepiece optical unit on which light from said image inverting optical unit is made incident, said eyepiece optical unit having a diffractive optical surface, and
    wherein said viewfinder optical system satisfies the following condition:

$$0.08 < |\psi d/\psi o| < 0.4$$

where $\psi d$ is an optical power of said diffractive optical surface in said eyepiece optical unit, and $\psi o$ is an optical power of said diffractive optical surface in said objective optical unit.

10. An optical apparatus comprising:
    a viewfinder optical system according to claim 9.

* * * * *

UNITED STATES PATENT AND TRADEMARK OFFICE
CERTIFICATE OF CORRECTION

PATENT NO. : 6,144,502

DATED : November 7, 2000

INVENTOR(S) : SHINGO HAYAKAWA, ET AL.

It is certified that error appears in the above-identified patent and that said Letters Patent is hereby corrected as shown below:

Column 10

Line 30, "the." should read --the--.
Line 53, "Wie" should read --Ψe--.

Column 12

Line 23, "B = -5.548131 · $10^{-5}$" should read
--B = -5.54813 · $10^{-5}$--.

Signed and Sealed this

Twenty-ninth Day of May, 2001

Attest:

NICHOLAS P. GODICI

*Attesting Officer*    *Acting Director of the United States Patent and Trademark Office*